(12) United States Patent
Abe

(10) Patent No.: US 6,731,582 B2
(45) Date of Patent: May 4, 2004

(54) DISC DRIVE APPARATUS UTILIZING OPPOSABLE BASES WITH ADJUSTABLE PROXIMITY

(75) Inventor: Hiroshi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 352 days.

(21) Appl. No.: 09/863,122

(22) Filed: May 22, 2001

(65) Prior Publication Data

US 2002/0015374 A1 Feb. 7, 2002

(30) Foreign Application Priority Data

May 26, 2000 (JP) ........................................ 2000-156058

(51) Int. Cl.⁷ ............................ G11B 33/02; G11B 17/04
(52) U.S. Cl. ..................................................... 369/77.1
(58) Field of Search ............................. 369/77.1, 77.2, 369/75.1, 75.2, 178

(56) References Cited

U.S. PATENT DOCUMENTS

| | | | | |
|---|---|---|---|---|
| 4,829,501 A | * | 5/1989 | Seto et al. ................. | 369/75.2 |
| 5,574,705 A | * | 11/1996 | Suzuki ..................... | 369/30.89 |
| 6,091,695 A | * | 7/2000 | Takigawa et al. ......... | 369/30.89 |
| 6,222,811 B1 | * | 4/2001 | Sakurai et al. ............ | 369/77.1 |
| 6,226,249 B1 | * | 5/2001 | Takigawa .................. | 369/77.1 |
| 6,434,102 B1 | * | 8/2002 | Fujiwara et al. ........... | 369/77.2 |

FOREIGN PATENT DOCUMENTS

WO    WO 00/48187    8/2000

* cited by examiner

*Primary Examiner*—A. J. Heinz
*Assistant Examiner*—Angel Castro
(74) *Attorney, Agent, or Firm*—Brinks Hofer Gilson & Lione

(57) ABSTRACT

A disc drive includes a linking arm, which is rotatably supported on the side plate of a top base by a supporting shaft. The linking arm includes a connecting pin, which is engaged with a bottom base. When the top base and the bottom base approach each other and a disc is clamped, the linking arm rotates clockwise. The rotation of the linking arm is converted to a rotation in a horizontal plane, and the power obtained after the conversion is used for the operation of pressuring the clamp or other operations.

14 Claims, 12 Drawing Sheets

DISC DRIVE APPARATUS UTILIZING OPPOSABLE BASES WITH ADJUSTABLE PROXIMITY

BACKGROUND OF THE INVENTION

1. Field of the Invention

The present invention relates to disc drives that drive various discs such as CDs, DVDs, magnetic optical discs, etc., and more specifically relates to a disc drive in which various operation modes can be set by using the moving force between bases.

2. Description of the Related Art

FIGS. 12A and 12B are partly sectioned views showing a disc-clamping unit of a conventional disc drive. In the disc drive shown in FIGS. 12A and 12B, a spindle motor 122 is provided on a drive base 121, and a rotating shaft 123 of the spindle motor 122 projects upward from the drive base 121. In addition, a turntable 124 is fixed to the rotating shaft 123. A clamp base 125, which opposes the drive base 121, is provided with an opening 125a. A clamp 126 is inserted into the opening 125a from the upper side thereof, and a flange 126a formed at the upper end of the clamp 126 is supported by the top surface of the clamp base 125. In addition, the clamp base 125 is also provided with an elastic member 127, which presses the clamp 126 toward the turntable 124.

As shown in FIG. 12A, when the drive base 121 and the clamp base 125 are in a state in which they are further separated from each other, a gap having a size of H0 is provided between the turntable 124 and the clamp 126 for receiving a disc D. When the disc D is inserted into the gap, the clamp base 125 moves downward, and a central opening D1 of the disc D engages with the turntable 124. Accordingly, the disc D is pressed against the turntable 124 by the clamp 126. The disc D is held in this position and is rotated by the spindle motor 122 and the turntable 124.

In the disc drive shown in FIGS. 12A and 12B, various operation modes must be set in association with the operation of moving the clamp base 125 downward and clamping the disc D. For example, positioning members for positioning the disc D must be retracted, and the bases must be released from a locking device, which is provided for locking the bases elastically supported on a chassis. In addition, a head, which is restrained on the chassis, must also be released.

Conventionally, the timing of the above-described operations is controlled by linking mechanical components such as levers, plates, etc., which are provided on the drive base 121 or to the clamp base 125, and by driving such mechanical components by a motor, etc. Thus, a large number of mechanical components are required, and the construction of the disc drive is complex.

In addition, in some disc drives of this type, an up/down switching member, which slides toward the right and the left in FIGS. 12A and 12B, is provided on the drive base 121. The up/down switching member is provided with an inclined groove, which is used for controlling the downward movement of the clamp base 125. It has been suggested that the above-described mechanical components be driven in accordance with the movement of the up/down switching member. However, since the up/down switching member has a large moving range, it is difficult to convert the movement thereof to the movements of other mechanical components provided on the bases.

SUMMARY OF THE INVENTION

Accordingly, it is an object of the present invention to provide a disc drive which is free from the above-described problems of the conventional type. More specifically, it is an object of the present invention to provide a disc drive in which various operation modes can be set at the same time the opposing bases approach each other, and in which the mechanism for setting the operation modes is simple.

To this end, according to one embodiment of the present invention, a disc drive comprises a bottom base; a top base which opposes the bottom base with a gap therebetween; a turntable which is provided on one of the bottom base and the top base; a motor for rotating said turntable; a clamp which is provided on the other base, and which presses a disc against the turntable; an up/down switching unit which moves at least one of the bottom base and the top base between a position in proximity to the other base and a position further separated from the other base; a linking member which is rotatably supported by one of the bottom base and the top base at the side thereof, and which is rotated by the other base when the bottom base and the top base move closer to and/or away from each other; and a driving member which is provided on one of the bottom base and the top base, which is operated by the rotational force of the linking member, and which sets an operational mode for driving the disc.

At least one of the bottom base and the top base may be provided with a direction-converting member which converts the rotational force of the linking member to the rotational force along the surfaces of the bases, and wherein the driving member may be moved along the surfaces of the bases due to the operation of the direction-converting member.

The driving member may perform a clamping operation in which the clamp is pressed against the disc. In addition, in the case in which a positioning member for positioning the disc on the turntable is provided, the positioning member may be moved, after the disc is clamped on the turntable, to a position away from the disc.

The driving member may be used for releasing the bases from a locking unit which locks the bases on a chassis, so that the bases are elastically supported on the chassis. In addition, an optical head, etc., which is provided on one of the bases, may be restrained from moving when in a state in which the disc drive is waiting for a disc to be inserted, and the driving member may be used for releasing them when the clamping of the disc is completed.

According to the present invention, the turntable may be provided on the top base, and the clamp may be provided on the bottom base. In addition, both of the top base and the bottom base may be moved toward each other.

Accordingly, in the present invention, various operation modes may be set by utilizing the movement of the bases which approach each other. Thus, each of the operation modes may be set at the same time the clamping of a disc by the bases is completed. In addition, construction for transmitting the power in the mechanism for setting various operation modes may be made simple.

DESCRIPTION OF THE PREFERRED EMBODIMENTS

Figure 1:
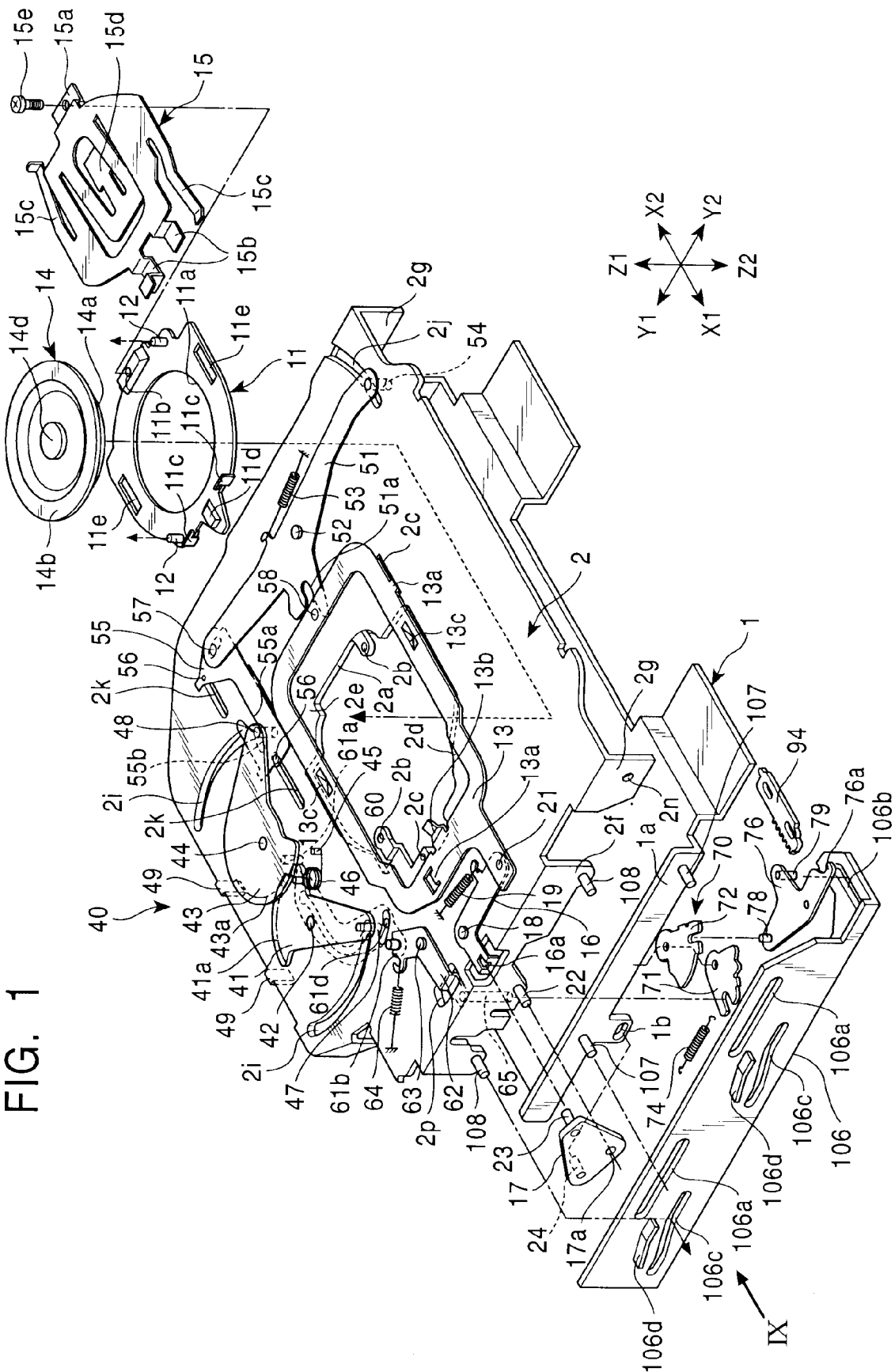
FIG. 1 is an exploded perspective view of a thin disc drive according to an embodiment of the present invention.
Figure 6:
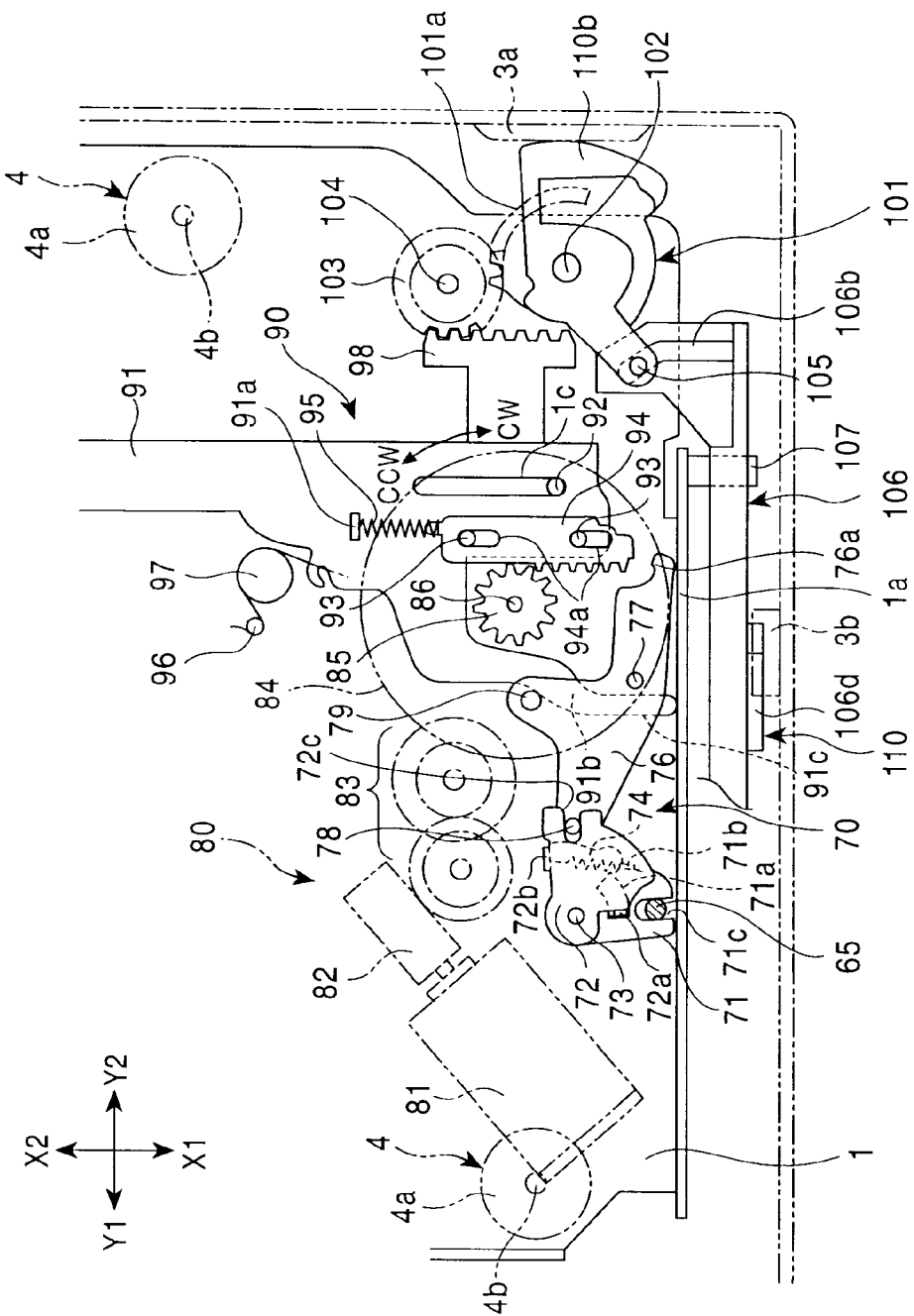
FIG. 6 is a plan view of a part of the disc drive, showing a mechanism at a bottom base in a state in which the disc drive waits for a disc to be inserted.
Figure 8:
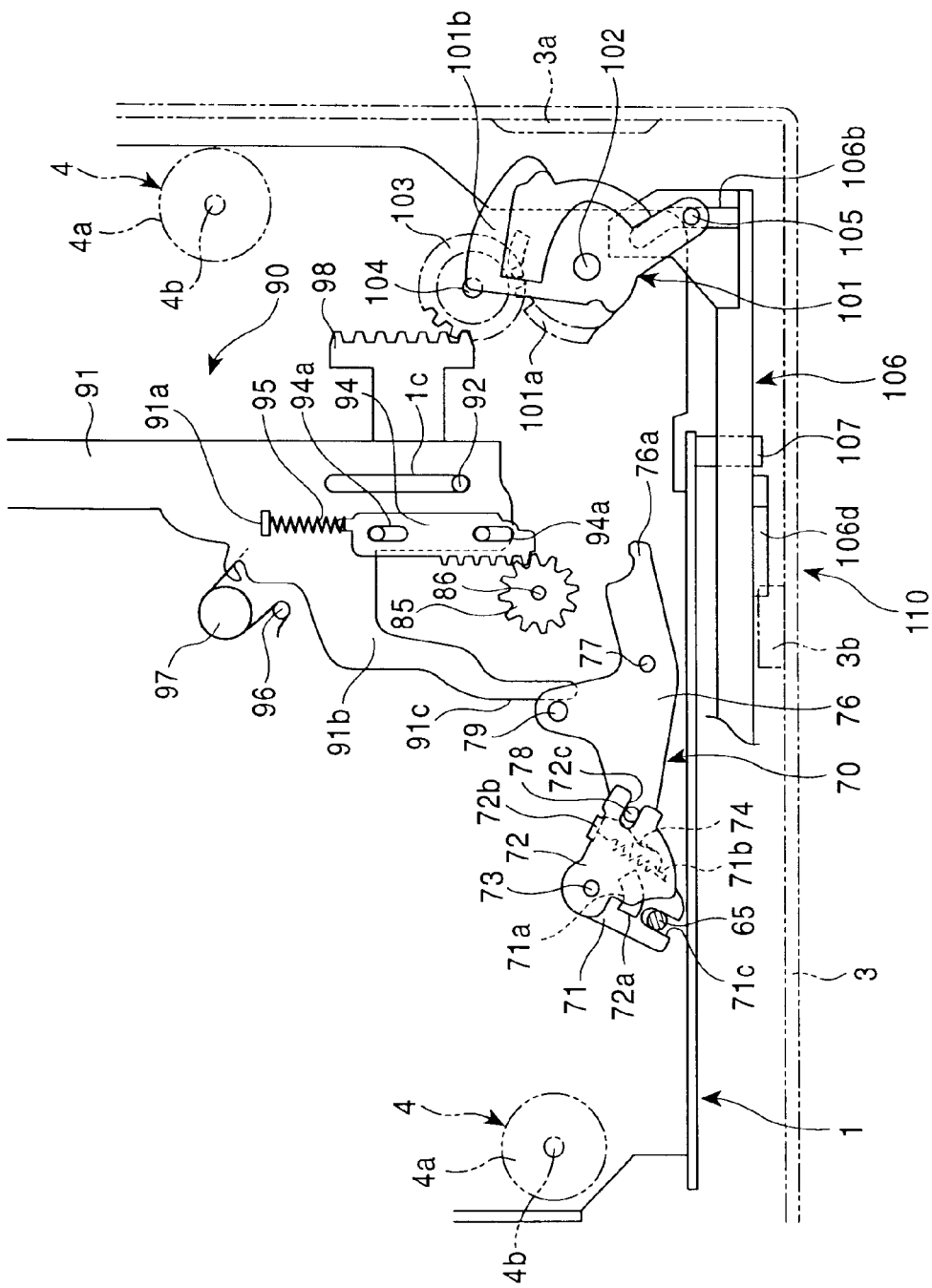
FIG. 8 is a plan view of a part of the disc drive, showing the mechanism around the bottom base in a state in which the mounting of the disc is completed.
Figure 9A:
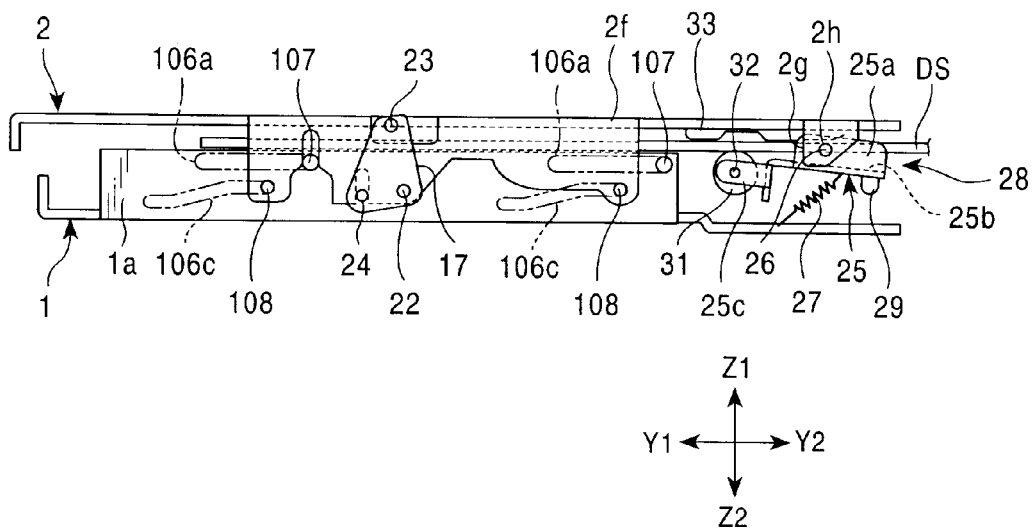
FIGS. 9A and 9B are side views of FIG. 1 as seen from arrow IX for explaining a disc clamping operation.
Figure 9B:
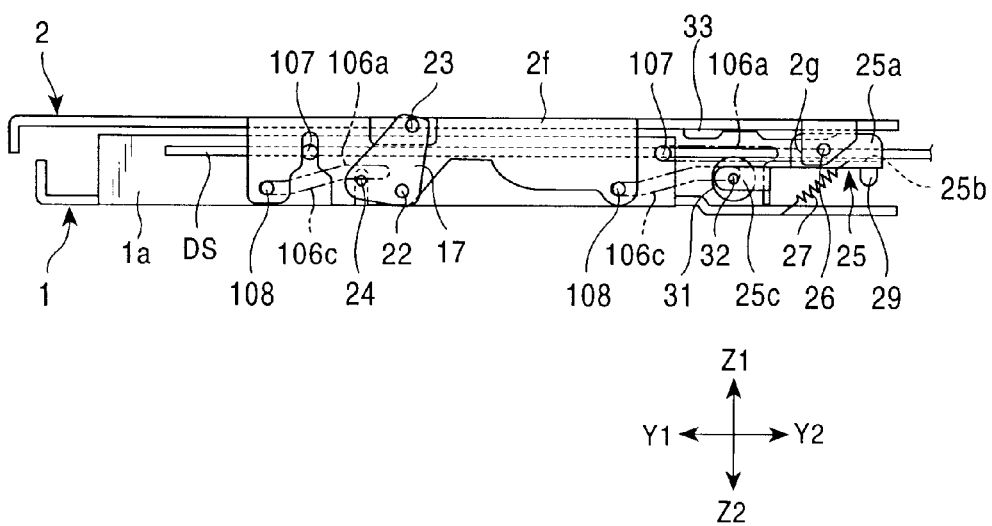

With reference to FIGS. 1, 9A, and 9B, a thin disc drive according to an embodiment of the present invention includes a bottom base 1 which functions as a drive base, and a top base (movable base) 2 which functions as a clamp base. The bottom base 1 and the top base 2 are attached to each other in a manner such that bottom base 1 and the top base 2 oppose each other in the vertical direction. A disc is inserted between the bottom base 1 and the top base 2 in the Y1 direction. As shown in FIGS. 6 and 8, a mechanical unit, which is constructed by joining the bottom base 1 and the top base 2, is installed in a chassis 3 Additionally, elastic supporters 4 are provided between the bottom base 1 and the chassis 3. Each of the elastic supporters 4 includes a damper 4a and a supporting shaft 4b. The damper 4a is constructed of a rubber bladder containing an oil or air, and is fixed to the upwardly facing surface of the bottom plate of the chassis 3. The supporting shaft 4b, which is fixed to the bottom surface of the bottom base 1, is elastically supported by the damper 4a.

The disc drive is suitable to be mounted in vehicles. When a disc undergoes recording or reading, the mechanical unit including the bottom base 1 and the top base 2 is elastically supported inside the chassis 3. However, when the disc is being inserted or extracted, the bottom base 1 is locked inside the chassis 3 by a locking unit 110, which will be described below.

With respect to the size of the disc drive including the bottom base 1, the top base 2, and the chassis 3, the width thereof in the X direction and the depth thereof in the Y direction are small enough that the disc drive may be installed in space having a standardized size, which is often expressed as a single DIN (Deutsche Industry Normen) size. In addition, the height of the disc drive in the Z direction is half the height of the single DIN size. Accordingly, for example, when the disc drive is installed in an instrument panel of a vehicle, space having the single DIN sized may contain both the disc drive and another apparatus such as an MD drive, a radio tuner, a container for a display, etc.

The disc drive is able to receive both small-diameter discs DS having a diameter of 8 cm and large-diameter discs DL having a diameter of 12 cm. The above-described discs DS and DL are, for example, CDs, CD-ROMs, CD-RAMs, magnetic optical discs, etc.

Figure 11A:
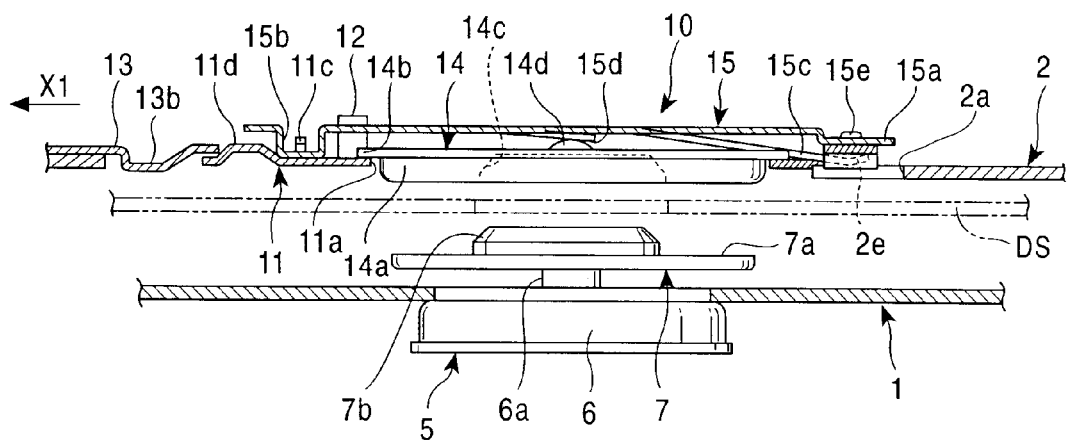
FIGS. 11A and 11B are partly sectioned views showing the disc clamping operation.
Figure 11B:
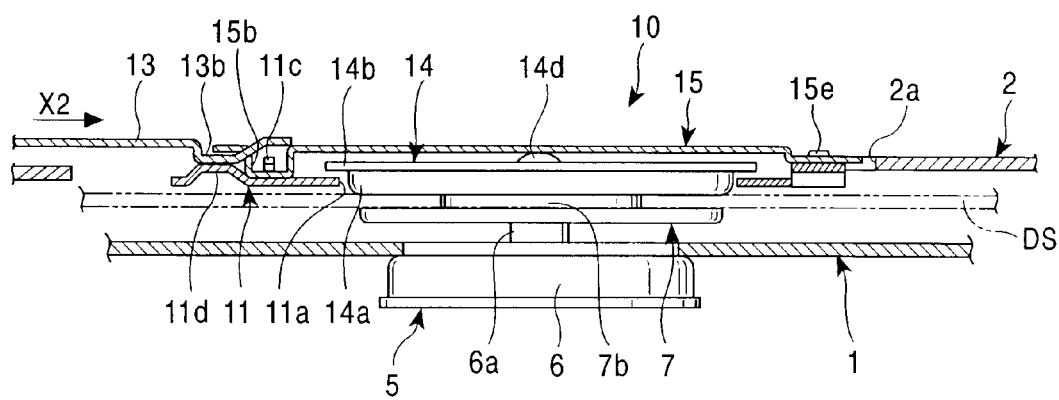
Figure 12A:
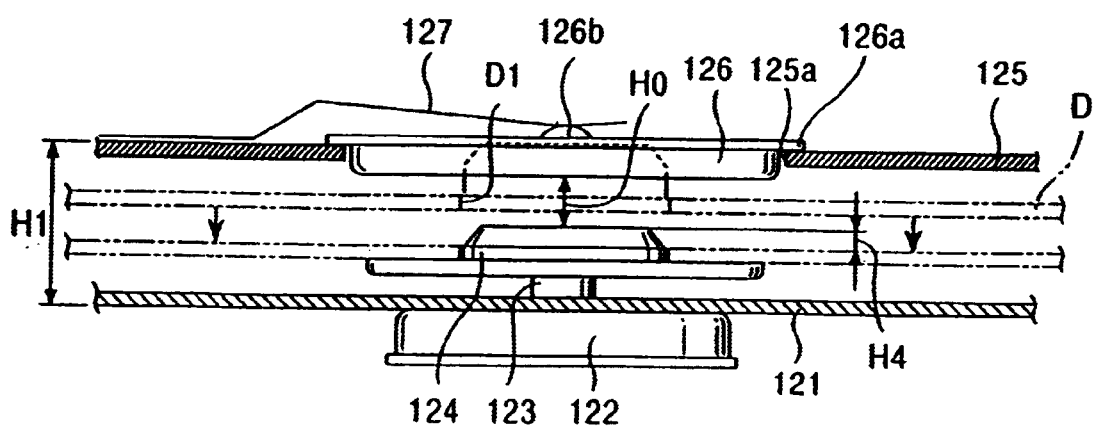
FIGS. 12A and 12B are partly sectioned views of a conventional disc-clamping unit.
Figure 12B:
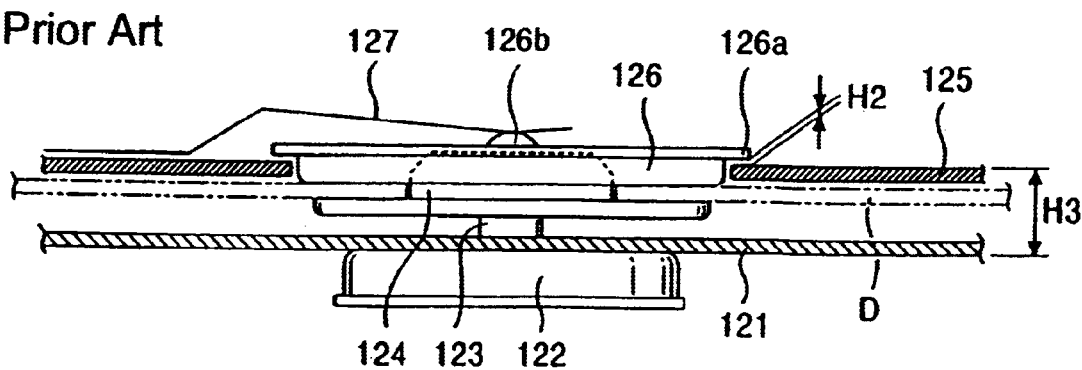

As shown in FIGS. 11A and 11B, the bottom base 1 is provided with a disc driving unit 5 at the central region thereof. The disc driving unit 5 includes a spindle motor 6 which is fixed to the bottom surface of the bottom base 1, a rotating shaft 6a which projects upward from the top surface of the bottom base 1, and a turntable 7 which is fixed to the rotating shaft 6a. The turntable 7 is provided with a flange 7a which is used for positioning the bottom surface of a disc, and a guide hub 7b which has a tapered guide surface at the upper periphery thereof. In addition, the bottom base 1 is also provided with an optical head (not shown) for writing or reading data on a disc which is mounted on the turntable 7.

Construction of a Disc-clamping Unit

The top base 2 is provided with a disc-clamping unit 10 which opposes the disc driving unit 5 at the upper side thereof. As shown in FIGS. 1, 10, 11A, and 11B, the disc-clamping unit 10 is disposed inside an opening 2a formed in the top base 2. Two retaining holes 2b and 2b are formed at two positions at the periphery of the opening 2a. In addition, a clamp-driving member 13 is provided at the upper side of the top base 2, and is disposed in a manner such that the opening 2a is surrounded by the clamp-driving member 13. The clamp-driving member 13 is formed of a thin metal plate, and is provided with bent portions 13a and 13a. The top base 2 is provided with slits 2c and 2c which extend in the X direction, and the bent portions 13a and 13a are inserted through the slits 2c and 2. Accordingly, the clamp-driving member 13 is slidable in the X direction.

Figure 10:
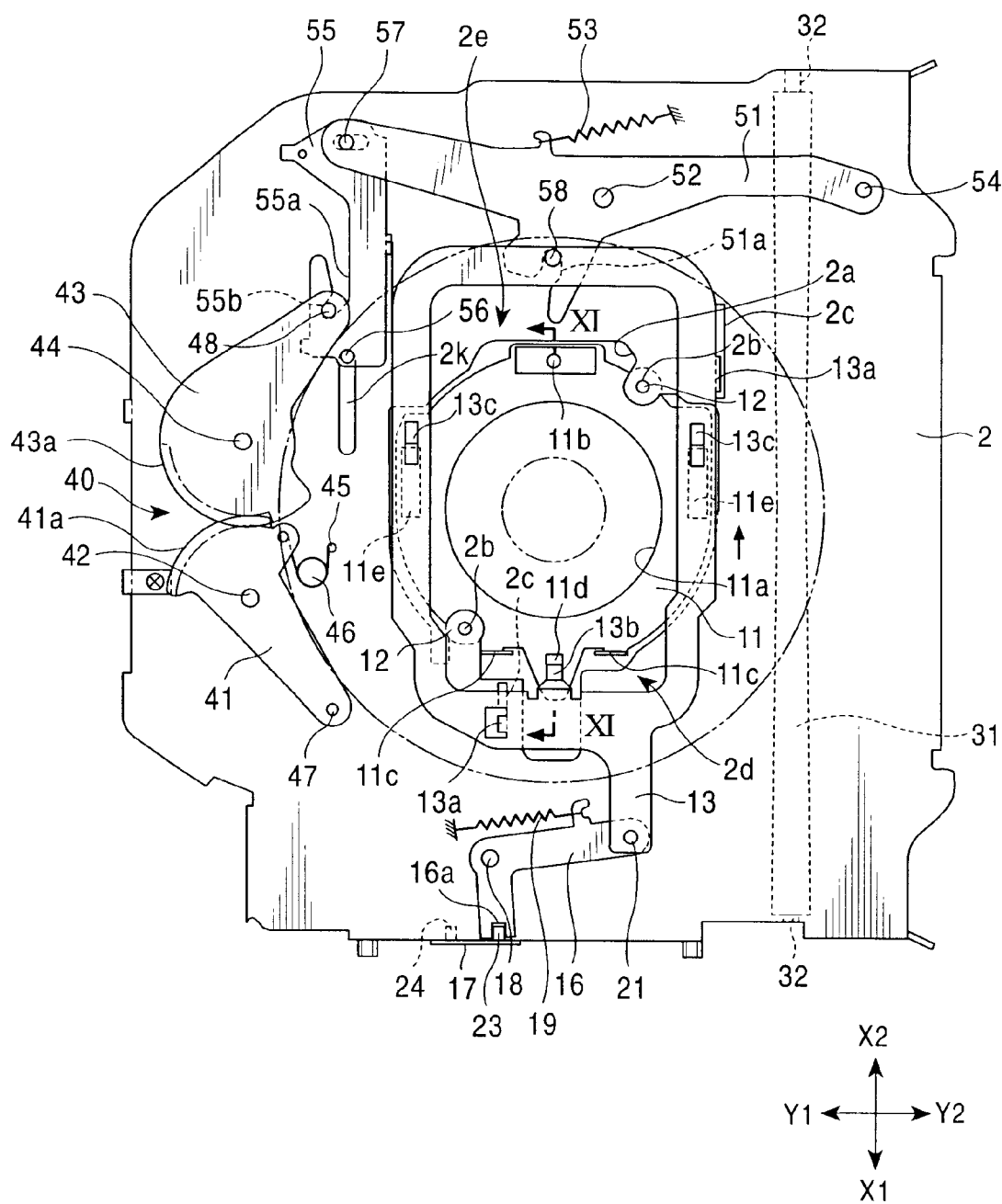
FIG. 10 is a plan view of the disc drive, showing a state in which the disc clamping operation is completed by a disc-clamping unit.

As shown in FIG. 1, a clamp-supporting member 11 is formed of a ring-shaped thin metal plate, and two shafts 12 and 12 are fixed thereto at separate positions on the top surface. The clamp-supporting member 11 is disposed inside the opening 2a of the top base 2 by inserting the shafts 12 and 12 into the retaining holes 2b and 2b from the lower side. Accordingly, as shown in FIG. 10, the clamp-supporting member 11 is positioned inside the opening 2a of the top base 2 at the lower side of the clamp-driving member 13. In addition, since the shafts 12 and 12 are inserted through the retaining holes 2b and 2b, the clamp-supporting member 11 is movable in the vertical direction (the Z direction).

A central opening 11a is formed in the clamp-supporting member 11. In addition, the clamp-supporting member 11 is provided with a protrusion at the edge thereof in the X2 direction, and a tapped hole 11b is formed in the protrusion. The clamp-supporting member 11 is also provided with a pair of hook-shaped restraining projections 11c and 11c, which are bent upward, at the edge thereof in the X1 direction.

A clamp 14 is formed of a synthetic resin, and includes a disc-pressing portion 14a. The disc-pressing portion 14a is provided with a supporting flange 14b which is integrally formed therewith at the upper periphery thereof. In addition, the disc-pressing portion 14a is also provided with a concave portion 14c in the bottom surface thereof which opposes the guide hub 7b of the turntable 7. In addition, the clamp 14 also includes a pivot 14d which is integrally formed therewith at the center of the upper surface thereof. The clamp 14 is mounted on the clamp-supporting member 11, which is disposed inside the opening 2a of the top base 2. More specifically, as shown in FIG. 11A, the disc-pressing portion 14a of the clamp 14 is inserted inside the central opening 11a of the clamp-supporting member 11, and the supporting flange 14b overlaps on the peripheral portion around the central opening 11a of the clamp-supporting member 11.

The clamp-supporting member 11 and the clamp 14 which are disposed inside the opening 2a are supported by a supporter 15. The entire body of the supporter 15 is formed of a material for leaf springs such as a stainless steel spring plate, a phosphor bronze plate, etc. The supporter 15 is provided with an attachment tab 15a at the edge thereof in the X2 direction, and with a pair of restraining tabs 15b and 15b at the edge thereof in the X1 direction. In addition, the supporter 15 is also provided with first elastic arms 15c and 15c which are integrally formed therewith at the edges thereof in the Y1 and Y2 directions which extend downward in the opposite directions, and which serve as first elastic members.

As described above, the clamp-supporting member 11 is first disposed under the clamp-driving member 13, and the clamp 14 is then mounted on the clamp-supporting member 11. Then, the supporter 15 is installed from the upper side of the top base 2. Then, in a manner such that the restraining tabs 15b and 15b are restrained under the restraining projections 11c and 11c, a screw 15e is inserted through the attachment tab 15a, and is screwed into the tapped hole 11b.

Accordingly, the clamp-supporting member 11 and the supporter 15 are fixed to each other in a manner such that a clamp 14 is sandwiched therebetween. At this time, the first elastic arms 15c and 15c are bent and abut on supporting surfaces 2d and 2e which are provided at the upper side of the top base 2, so that the supporter 15 and the clamp-supporting member 11, which is fixed to the supporter 15, receive an upward force. Accordingly, the clamp-supporting member 11 is pressed against the bottom surface of the clamp-driving member 13 at the top surfaces of the side portions thereof in the Y1 and the Y2 directions. In addition, a second elastic arm 15d, which is provided on the supporter 15 at the center thereof, abuts on the pivot 14d of the clamp 14, so that the clamp 14 receives a downward force. Accordingly, the supporting flange 14b of the clamp 14 is pressed downward against the periphery of the central opening 11a of the clamp-supporting member 11.

As shown in FIGS. 1, 10, and 11, the clamp-supporting member 11 is provided with an upward protrusion 11d which is integrally formed therewith at the edge thereof in the X1 direction. In addition, the clamp-supporting member 11 is also provided with a pair of clearance holes 11e and 11e at the central position in the X directions of the edges thereof in the Y direction.

In addition, the clamp-driving member 13 is provided with a first pressing portion 13b at the edge thereof in the X1 direction and with a pair of second pressing portions 13c and 13c at the edges thereof in the Y direction. The first pressing portion 13b and the second pressing portions 13c and 13c are bent downward (in the Z2 direction).

With reference to FIG. 11A, the clamp-driving member 13 is moved in the X1 direction, and the first pressing portion 13b is separated from the protrusion 11d. At this time, the second pressing portions 13c and 13c are inserted in the clearance holes 11e and 11e. In addition, the supporter 15 and the clamp-supporting member 11 are lifted by the first elastic arms 15c, and are pressed against the bottom surface of the clamp-driving member 13.

FIG. 11B shows a state in which the top base 2 is moved downward toward the bottom base 1 by an up/down switching member, which will be explained below. In accordance with the downward movement of the top base 2, the central portion of the disc is sandwiched by the clamp 14 and the turntable 7. Then, when the clamp-driving member 13 is moved in the X2 direction, the first pressing portion 13b of the clamp-driving member 13 is disposed directly above the protrusion 11d of the clamp-supporting member 11. In addition, the second pressing portions 13c and 13c come out from the clearance holes 11e and 11e of the clamp-supporting member 11, and is mounted on the top surface of the clamp-supporting member 11 (see FIG. 10). Accordingly, the clamp-supporting member 11 is pressed downward toward the turntable 7, and moves away from the clamp 14. In addition, the second elastic arm 15d of the supporter 15 applies downward force to the clamp 14, and the disc is elastically supported between the turntable 7 and the clamp 14.

As shown in FIG. 1, the mechanical unit is provided with a clamp-switching unit at the side thereof in the X1 direction, which moves the clamp-driving member 13 in the X1 and the X2 directions. The clamp-switching unit includes a direction-converting arm (direction-converting member) 16 which is attached to the top base 2, and a linking arm (linking member) 17 which is disposed between the bottom base 1 and top base 2.

The direction-converting arm 16 is formed of an L-shaped metal plate, and is supported by a shaft 18 in a manner such that the direction-converting arm 16 can rotate above the top base 2. A draft spring 19 is provided between the direction-converting arm 16 and the top base 2, and the direction-converting arm 16 continuously receives a counterclockwise force. One end of the direction-converting arm 16 is connected to the clamp-driving member 13 with a connecting pin 21. The other end of the direction-converting arm 16 is bent downward at the edge of the top base 2 in the X1 direction, and is provided with a connecting groove 16a.

As shown in FIGS. 1, 9A, and 9B, the top base 2 is provided with a side plate 2f at the edge thereof in the X1 direction. The side plate 2f is formed by being bent downward, and a supporting shaft 22 is fixed thereto. The linking arm 17 has an approximately triangular shape, and is provided with a retaining hole 17a, through which the supporting shaft 22 is inserted. Accordingly, the linking arm 17 is rotatably supported by the side plate 2f of the top base 2.

Connecting pins 23 and 24, which extend in the X2 direction, are fixed to the linking arm 17. The connecting pin 23 is inserted through the connecting groove 16a formed in the direction-converting arm 16. The bottom base 1 is provided with a side plate 1a at the edge thereof in the X1 direction. The side plate 1a is formed by being bent upward, and is provided with an oblong linking hole 1b. The oblong linking hole 1b extends in the Y direction, and the connecting pin 24 is inserted therethrough.

Figure 2:
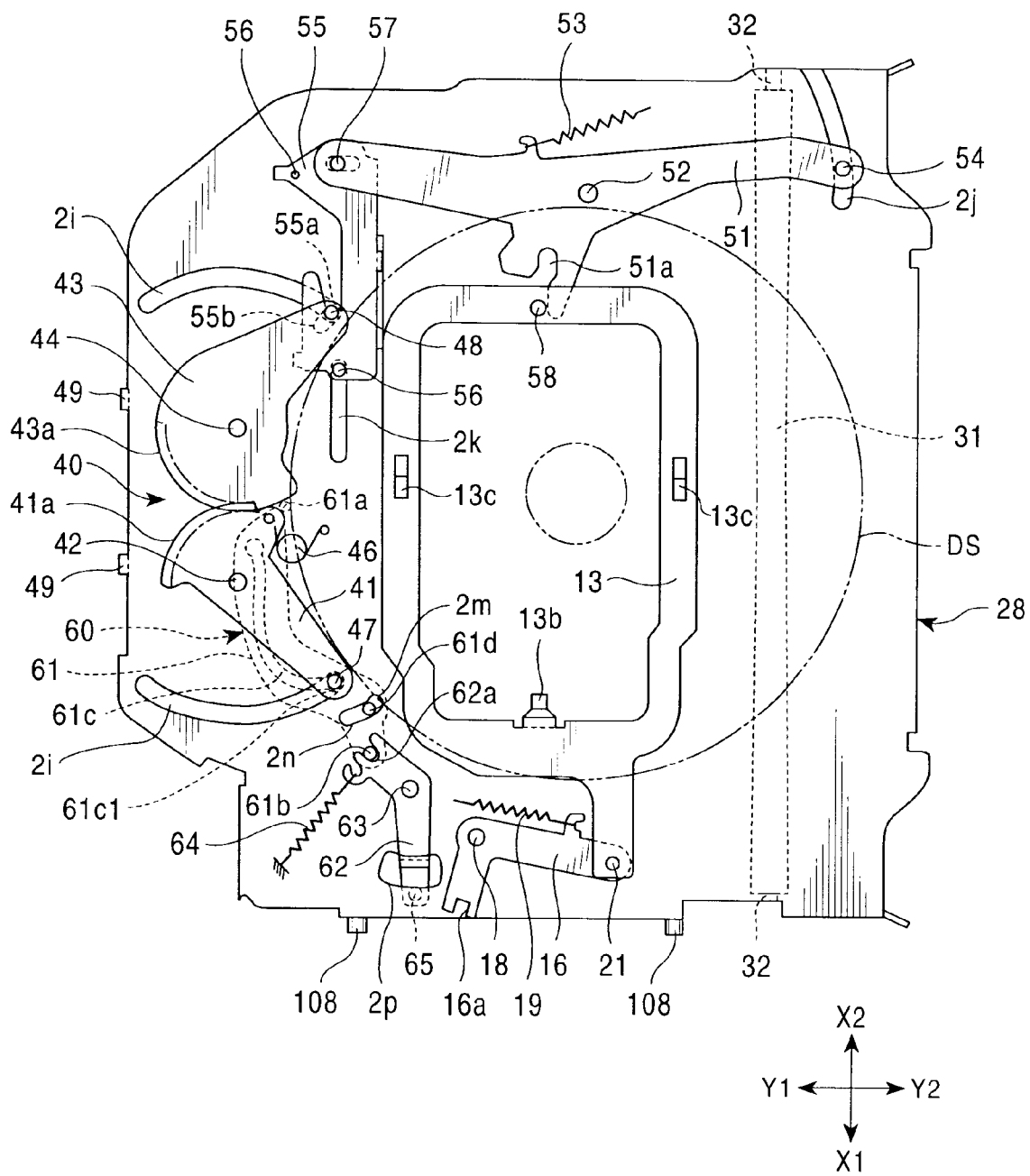
FIG. 2 is a plan view of the disc drive, showing a state just before a small-diameter disc is inserted and positioned.

As shown in FIG. 9A, when the top base 2 is moved upward in the Z1 direction relative to the bottom base 1 and the bottom base 1 and the top base 2 are in a state in which they are further separated from each other, the linking arm 17 is rotated counterclockwise in FIG. 9A. At this time, as shown in FIG. 2, the direction-converting arm 16 is rotated clockwise in the horizontal plane, and the clamp-driving member 13 is moved in the X1 direction. As shown in FIG. 9B, when the top base 2 is moved downward in the Z2 direction and the top base 2 moves closer to the bottom base 1, the linking arm 17 rotates clockwise, and, as shown in FIG. 10, the direction-converting arm 16 is rotated counterclockwise. Accordingly, the clamp-driving member 13 is moved in the X2 direction, and the above-described clamping operation is performed.

Construction of a Disc-transferring Unit and a Disc-positioning Unit

As shown in FIGS. 1, 9A and 9B, the top base 2 is also provided with small side plates 2g and 2g at the edges thereof in the X1 and X2 directions and at the end thereof in the Y2 direction. The small side plates 2g and 2g are formed by being squarely bent downward, and are provided with retaining holes 2h and 2h, which are coaxially positioned. In addition, the top base 2 is also provided with a roller-supporting member 25 at the bottom side thereof and at the end thereof in the Y2 direction. The roller-supporting member 25 is formed of a metal plate, and end portions thereof in the X direction are bent upward, forming side plates 25a and 25a.

The side plates 25a and 25a are provided with supporting shafts 26 and 26 which project form the outwardly facing surfaces thereof. The supporting shafts 26 and 26 are inserted through the retaining holes 2h and 2h formed in the small side plates 2g and 2g, thereby being rotatably supported. A draft spring 27 is provided between the roller-supporting member 25 and the bottom base 1, and the roller-supporting member 25 continuously receives a clockwise force as shown in FIG. 9A. The top surface of the bottom plate between the side plates 25a and 25a of the roller-supporting member 25 serves as a guide surface 25b, and a disc receiving/ejecting slot 28 is formed between the guide surface 25b and the top base 2. In addition, a protrusion 29 is formed on the bottom surface of the roller-supporting member 25 at the edge thereof in the Y2 direction. The protrusion 29 is formed of a pin which is fixed to the bottom surface of the roller-supporting member 25.

The roller-supporting member 25 is also provided with supporting tabs 25c and 25c at the edges thereof in the X1 and X2 directions, which extend in parallel to each other in the Y1 direction. A roller shaft 32, which supports a transfer roller 31, is rotatably supported by the supporting tabs 25c and 25c at both ends thereof. One end of the roller shaft 32 is fixed to a gear (not shown) which is disposed outside the supporting tab 25c, and the power is transmitted from a motor 81, which is provided on the bottom base 1 as shown in FIG. 6, to the roller shaft 32. Accordingly, the roller shaft 32 and the transfer roller 31 may be rotated in both the normal and the inverse directions. In addition, an opposing pad 33, which opposes the transfer roller 31, is fixed to the bottom surface of the top base 2. The opposing pad 33 is formed of a low-friction material such as a synthetic resin, etc.

As shown in FIG. 9A, when the top base 2 is further separated from the bottom base 1, the roller-supporting member 25 is rotated clockwise due to the tensile strength applied by the draft spring 27. At this time, the transfer roller 31 is pressed toward the opposing pad 33. In addition, the edge of the roller-supporting member 25 in the Y2 direction is moved downward, and the guide surface 25b tilts downward toward the Y2 direction. Accordingly, the receiving/ejecting slot 28 is widely opened. When the disc is inserted through the receiving/ejecting slot 28 in this manner, the disc is sandwiched between the transfer roller 31 and the opposing pad 33, and is transferred in the Y1 direction by the rotational force of the transfer roller 31. When the transfer roller 31 rotates in the reverse direction, the disc is ejected in the Y2 direction through the receiving/ejecting slot 28.

As shown in FIG. 9B, when the top base 2 is moved downward toward the bottom base 1, the protrusion 29 comes into contact with the top surface of a rotating member 101 (see FIG. 6) which is provided at the upper side of the bottom base 1. Accordingly, the roller-supporting member 25 is rotated counterclockwise in association with the downward movement of the top base 2. As a result, the transfer roller 31 is moved downward away from the opposing pad 33, and is separated from the disc. In addition, the receiving/ejecting slot 28, which is the gap between the guide surface 25b of the roller-supporting member 25 and the top base 2 becomes narrow.

In the disc drive, the transfer roller 31 transfers either one of the small-diameter disc DS and the large-diameter disc DL between the bottom base 1 and the top base 2. As shown in FIG. 11, however, only one turntable 7, which can drive both types of discs, is provided. Accordingly, the top base 2 is provided with a disc-positioning unit 40 for positioning both the center of the small-diameter disc DS and the center of the large-diameter disc DL on the turntable 7.

As shown in FIGS. 1 and 2, a pair of positioning arms 41 and 43 are provided at the upper side of the top base 2 and at the bottom edge of the disc drive (the edge in the Y1 direction). The positioning arms 41 and 43 are supported by the supporting shafts 42 and 44, respectively, in a manner such that the positioning arms 41 and 43 can rotate in a horizontal plane. The positioning arms 41 and 43 are provided with partial gears 41a and 43a, respectively, which are engaged with each other. In accordance with the engagement of the partial gears 41a and 43a, the positioning arm 41 and the positioning arm 43 rotate along with each other, in opposite directions.

The positioning arms 41 and 43 are provided with positioning projections (positioning members) 47 and 48, respectively, at the point ends thereof, which extend downward. The positioning projections 47 and 48 are formed of rods which are fixed to the positioning arms 41 and 43, respectively. The top base 2 is provided with arc-shaped slits 2i and 2i, which are centered on the supporting shafts 42 and 44, respectively. The positioning projections 47 and 48 are inserted through the slits 2i and 2i, respectively, and extend downward beyond the top base 2.

Figure 5:
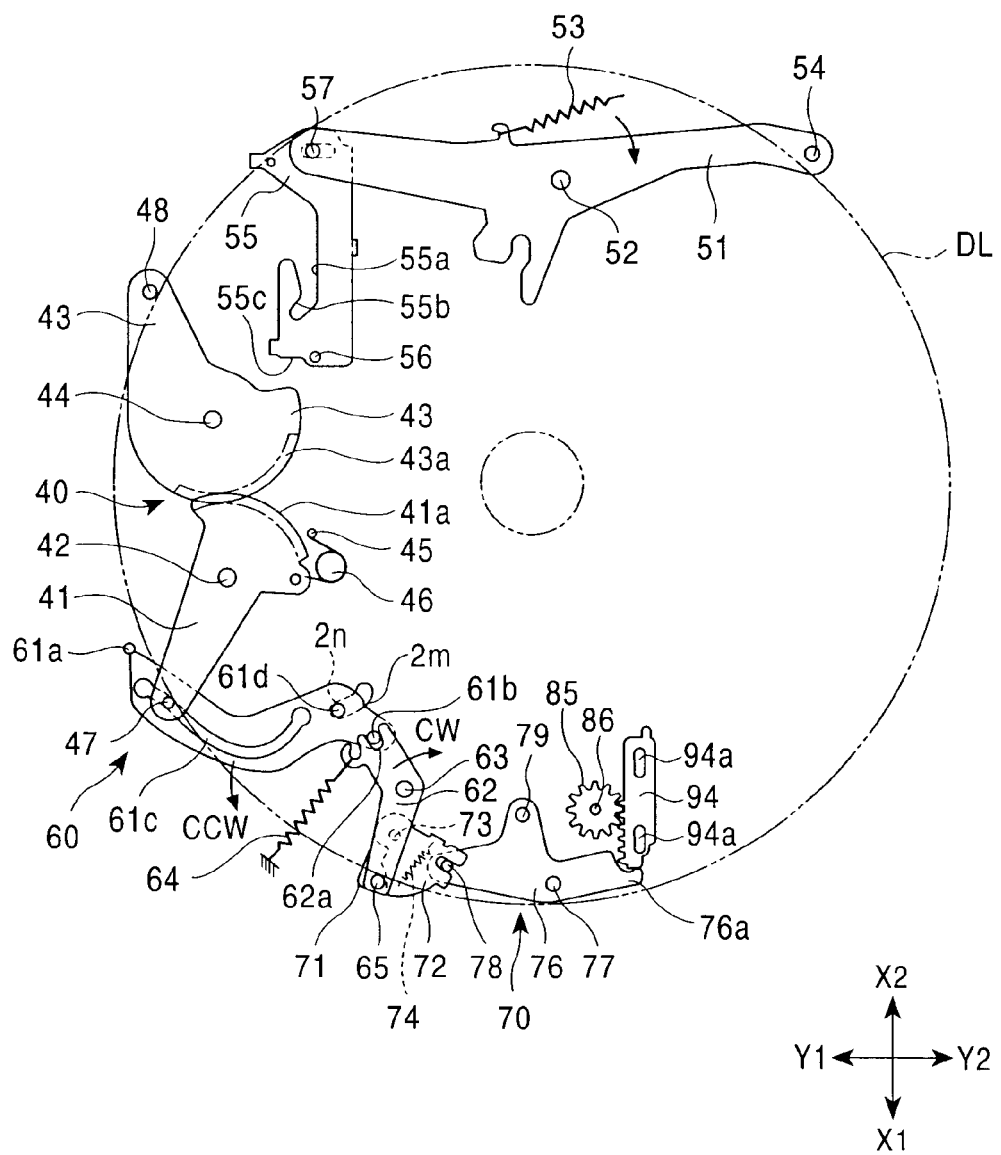
FIG. 5 is a plan view of a part of the disc drive, showing a state in which the large-diameter disc is positioned.

A reversing spring 46 is provided between the positioning arm 41 and a pin 45 which is disposed on the top base 2. As shown in FIG. 1 and FIG. 2, the reversing spring 46 applies force to the positioning arm 41 in a manner such that the positioning projections 47 and 48 are moved in the Y2 direction. As shown in FIG. 5, when the large-diameter disc DL is inserted, the positioning projections 47 and 48 are pressed in the Y1 direction, and the positioning arms 41 and 43 are rotated. Accordingly, the direction of the force applied by the reversing spring 46 is reversed, and the positioning arm 41 receives the force in a manner such that the positioning projections 47 and 48 are moved in the Y1 direction.

In addition, the top base 2 is provided with a pair of positioning members 49 and 49 which are integrally formed therewith at the edge thereof in the Y1 direction. The positioning members 49 and 49 are formed by being bent downward toward the lower side of the top base 2. In the case in which the large-diameter disc DL is inserted, the disc DL is positioned when it knocks against the positioning members 49 and 49.

As shown in FIGS. 1 and 2, the top base 2 is also provided with a type-detecting member 51 at the edge thereof in the X2 direction. The type-detecting member 51 is formed of an arm-shaped metal plate, and is rotatably supported by a supporting shaft 52. A draft spring 53 is provided between the type-detecting member 51 and the top base 2, and the type-detecting member 51 receives a clockwise force from the draft spring 53.

The type-detecting member 51 is provided with a detecting projection 54 at the end thereof in the Y2 direction. The detecting projection 54 is formed of a shaft which is fixed to the bottom surface of the type-detecting member 51, and which extends downward. The top base 2 is provided with an arc-shaped slit 2j which is centered on the supporting shaft 52. The detecting projection 54 is inserted through the slit 2j and projects downward beyond the top base 2.

The top base 2 is also provided with a positioning-and-locking member 55 at the upper side thereof and at the bottom edge of the disc drive (the edge in the Y1 direction). The positioning-and-locking member 55 is provided with guide pins 56 and 56, which are inserted through guide slits 2k and 2k, which are formed in the top base 2 and extend in the X direction. Accordingly, the positioning-and-locking member 55 is able to slide linearly in the X direction. In addition, the positioning-and-locking member 55 is connected to the type-detecting member 51 by a connecting pin 57.

The positioning-and-locking member 55 is provided with a groove for receiving the positioning projection 48 which is fixed to the positioning arm 43. The groove includes a restraining portion 55a which extends in the X direction, and a sheltering-and-restraining portion 55b which is continuously formed with the restraining portion 55a, and is inclined in the Y1 direction toward the X1 direction.

The type-detecting member 51 is also provided with a pressing groove 51a at the edge thereof in the X1 direction. The pressing groove 51a extends in the X2 direction, and slightly to the Y2 direction. The clamp-driving member 13 is provided with a restraining pin 58 at the edge thereof in the X2 direction, and when the clamp-driving member 13 is moved in the X2 direction, the restraining pin 58 is inserted into the pressing groove 51a.

Construction of Load Condition Detecting Unit

Figure 3:
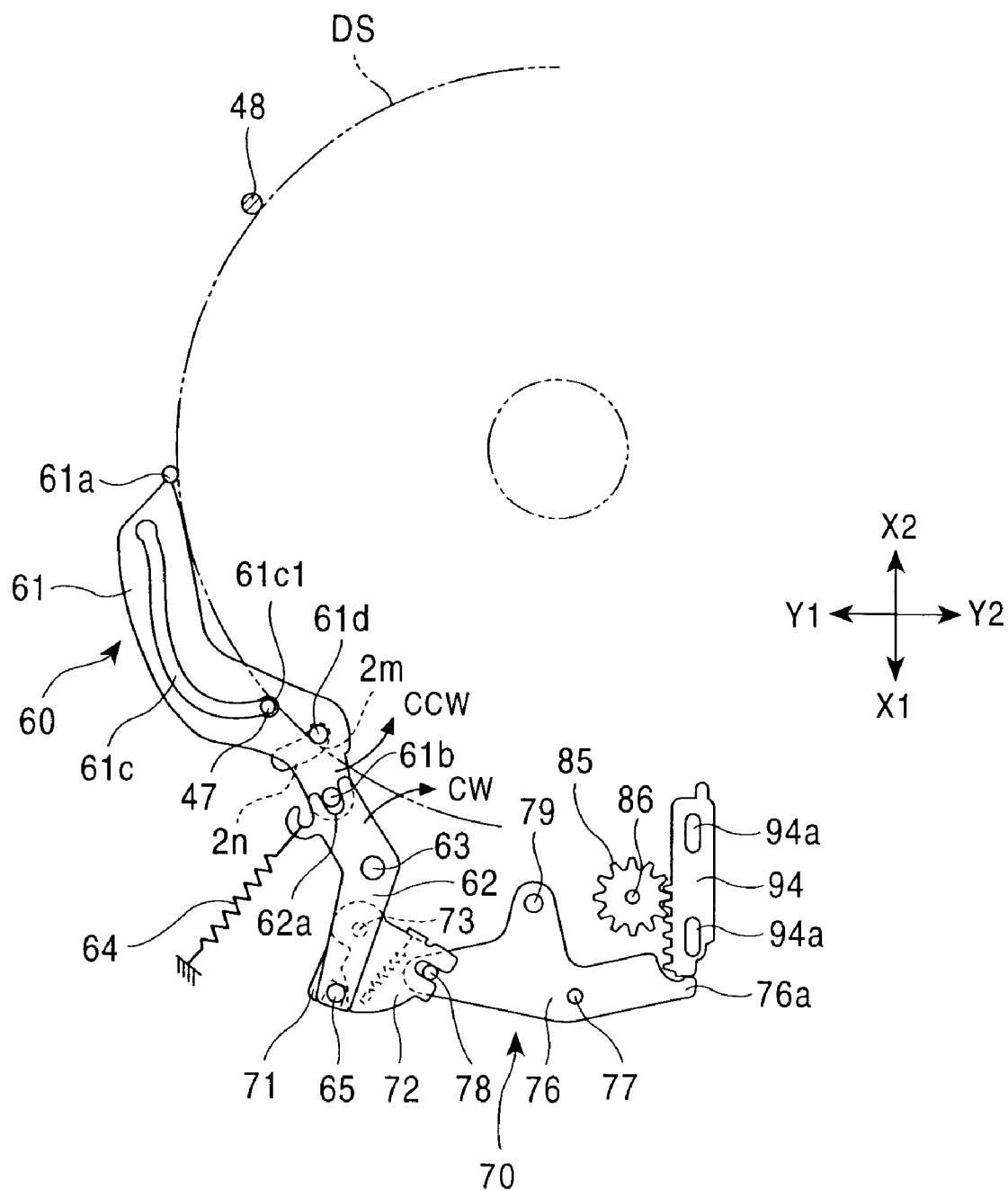
FIG. 3 is a plan view of a part of the disc drive, showing a state in which the small-diameter disc is positioned.

As shown in FIGS. 1, 2, and 3, a load condition detecting unit 60 is provided at the lower side of the top base 2 and at the bottom edge in the insertion direction of a disc (the edge in the Y1 direction). The load condition detecting unit 60 includes an arm-shaped detecting member 61. The detecting member 61 is provided with a detecting projection 61a which is integrally formed therewith. As shown in FIG. 2, in a state in which the disc drive waits for a disc to be inserted, the detecting projection 61a is positioned between the pair of positioning projections 47 and 48. Then, when the small-diameter disc DS is inserted and is transferred due to the transferring force applied by the transfer roller 31, the front end of the small-diameter disc DS in the inserting direction knocks against the detecting projection 61a.

The detecting member 61 is provided with a connecting pin 61b which is integrally formed therewith at the base end thereof. In addition, a cam hole 61c is formed between the detecting projection 61a and the connecting pin 61b. The positioning projection 47 of the positioning arm 41 is inserted through the cam hole 61c so that it can move in a slidable manner. More specifically, the positioning projection 47 is inserted through the slit 2i formed in the top base 2 and through the cam hole 61c, and further extends downward. In addition, the detecting member 61 is also provided with a moving pin 61d which is integrally formed therewith at the position between the connecting pin 61b and the cam hole 61c. The top base 2 is provided with a small arc-shaped moving hole 2m and 2n, which is continuously formed, and the moving pin 61d is inserted through the moving hole 2m and 2n from the lower side of the top base 2.

In addition, a starting member 62, which is rotatably supported by a supporting shaft 63, is provided at the upper side of the top base 2. The starting member 62 includes a connecting groove 62a at an end thereof, and the connecting pin 61b of the detecting member 61 is inserted inside the connecting groove 62a. A draft spring 64 is provided between the starting member 62 and the top base 2, and the starting member 62 receives a counterclockwise force from the draft spring 64. Accordingly, the detecting member 61 indirectly receives a clockwise force from the draft spring 64.

In a state in which the disc drive waits for a disc to be inserted as shown in FIG. 2, the positioning projection 47 is moved in the Y2 direction and is stably positioned by the reversing spring 46. At this time, the positioning projection 47 is inserted inside the cam hole 61c at the end 61c1 thereof in the X1 direction. In addition, the detecting member 61 receives the clockwise force around the positioning projection 47 from the draft spring 64. The moving hole 2m formed in the top base 2 has the shape of an arc centered on the positioning projection 47. The moving pin 61d is at the end of the moving hole 2m in the X1 direction.

As shown in FIG. 3, when the small-diameter disc DS is transferred in the Y1 direction and is positioned by knocking against the positioning projections 47 and 48, the disc DS pushes the detecting member 61 in the Y1 direction. Accordingly, the detecting member 61 rotates counterclockwise (CCW) around the positioning projection 47 within the range allowed by the movement of the moving pin 61d inside the moving hole 2m. As a result, the starting member 62 rotates clockwise (CW) around the supporting shaft 63.

As shown in FIG. 5, when the large-diameter disc DL is inserted, the positioning projections 47 and 48 are pressed in the Y1 direction, and the positioning arms 41 and 43 rotate in opposite directions around the shafts 42 and 44, respectively. In addition, the positioning projection 47 slides inside the cam hole 61c of the detecting member 61, so that the detecting member 61 rotates counterclockwise (CCW). The detecting member 61 first rotates counterclockwise (CCW) around the connecting pin 61b, and the moving pin 61d moves inside the moving hole 2n to the end thereof in the Y1 direction. Then, the detecting member 61 further rotates counterclockwise (CCW) around the moving pin 61d, which is moved to the end of the moving hole 2n in the Y1 direction. In addition, the starting member 62 rotates clockwise (CW) around the supporting shaft 63.

Accordingly, the starting member 62 rotates clockwise in both cases: when the small-diameter disc DS is inserted and the positioning thereof is completed, and when the large-diameter disc DL is inserted and the positioning thereof is completed.

Construction of Starting-and-transmitting Unit

As shown in FIGS. 1 and 2, the end portion of the starting member 62 extends through a clearance 2p, which is formed in the top base 2 at the edge thereof in the X1 direction, toward the lower side of the top base 2. In addition, a starting pin 65, which extends downward beyond the bottom base 1, is fixed to the end portion of the starting member 62. A starting-and-transmitting unit 70 is constructed of the starting member 62 and mechanical components provided at the lower side of the bottom base 1.

Figure 7:
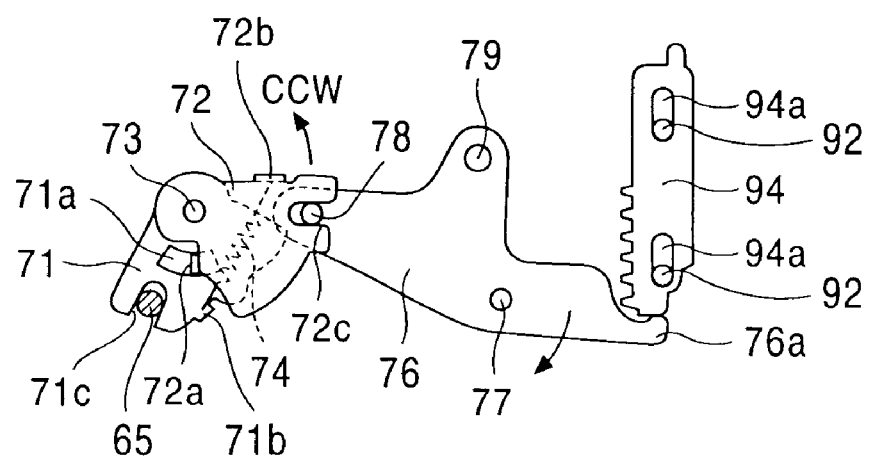
FIG. 7 is a plan view showing a part of the mechanism at the bottom base.

FIGS. 6, 7, and 8 show the mechanical components constructing the starting-and-transmitting unit 70 at the lower side of the bottom base 1. Although each of the mechanical components is disposed below the bottom base 1, they are shown by solid lines in FIGS. 6 and 8.

As shown in FIG. 6, a first transmitting member 71 and a second transmitting member 72 are rotatably supported by the same supporting shaft 73 at the lower side of the bottom base 1. The first transmitting member 71 is provided with a connecting hole 71a which is formed in the shape of an arc which has the supporting shaft 73 as a center. In addition, the second transmitting member 72 is provided with a connecting tab 72a which is formed by being bent, and which is inserted into the connecting hole 71a. The first and the second transmitting members 71 and 72 are provided with a spring-attaching tabs 71b and 72b, respectively, and a connecting spring 74 is attached to the spring-attaching tabs 71b and 72b at both ends thereof. The connecting spring 74 is a draft coil spring, which applies clockwise force to the second transmitting member 72 toward the first transmitting member 71. Accordingly, the connecting tab 72a abuts against the end portion of the connecting hole 71a at the left side in the figures, and the first and the second transmitting members 71 and 72 move in combination with each other.

However, as shown in FIG. 7, when the first transmitting member 71 is restrained and the second transmitting member 72 receives the counterclockwise (CCW) force, the connecting spring 74 is extended and the second transmitting member 72 is able to rotate relative to the first transmitting member 71.

The first transmitting member 71 is provided with a connecting opening 71c, through which the starting pin 65 which extends downward from the starting member 62 is inserted.

A third transmitting member 76, which is rotatably supported by a supporting shaft 77, is also provided at the lower side of the bottom base 1. The third transmitting member 76 has three arms. One of the arms is provided with a connecting pin 78, which is inserted through a connecting opening 72c formed in the second transmitting member 72. In addition, another arm is provided with a starting-and-pressing portion 76a, which presses a rack 94 shown in FIG. 8, and the remaining one of the arms is provided with a restraining projection 79. The restraining projection 79 is formed by fixing a pin to the third transmitting member 76.

As shown in FIG. 6, a driving unit 80 is provided under the bottom base 1. The driving unit 80 includes a motor 81 which is a power source, a worm gear 82 which is connected to the output shaft of the motor 81, and a reduction gear train 83 for transmitting the power from the worm gear 82. In addition, a first driving gear 84 having a large diameter and a second driving gear 85 having a small diameter is provided at the lower side of the bottom base 1. The power from the reduction gear train 83 is transmitted to the first driving gear 84, and the first driving gear 84 and the second driving gear 85 are rotated together.

When the insertion of a disc is detected, the motor 81 is started, and the first driving gear 84 and the second driving gear 85 are rotated counterclockwise (CCW) at a constant rotational speed until the disc is disposed on the turntable 7. When the disc is ejected, the first driving gear 84 and the second driving gear 85 are rotated clockwise (CW) at a constant rotational speed.

Although not shown in the figure, the rotating power of the first driving gear 84 is transferred to the gear fixed to the roller shaft 32 of the transfer roller 31 via transmitting gears. Accordingly, while the first driving gear 84 rotates counterclockwise, the transfer roller 31 also rotates counterclockwise, that is, the direction to transfer the disc inside the disc drive. In contrast, while the first driving gear 84 rotates clockwise, the transfer roller 31 also rotates clockwise, so as to apply a force of the disc in the ejecting direction.

In addition, a switching unit 90, which is activated by the driving unit 80 at the time when the force is applied from the starting-and-transferring unit 70, is also provided under the bottom base 1.

The switching unit 90 includes a switching-and-transmitting member 91. The switching-and-transmitting member 91 is provided with a guide shaft 92, which is inserted through an oblong hole 1c, which is formed in the bottom base 1 and extends in the X direction. Accordingly, the switching-and-transmitting member 91 is able to move linearly in the X direction. In addition, a pair of pins 93 and 93 are fixed to the switching-and-transmitting member 91. The rack 94 is provided at the upper side of the switching-and-transmitting member 91, and oblong holes 94a and 94a, which extend in the X direction, are formed in the rack 94. The pins 93 and 93 are inserted thorough the oblong holes 94a and 94a so that they can move in a slidable manner. Thus, the rack 94 is able to move in the X direction in a range allowed by the movement of the pins 93 and 93 inside the oblong holes 94a and 94a. A pressing spring 95 is provided between the end of the rack 94 in the X2 direction and a protruding tab 91a provided on the switching-and-transmitting member 91. The rack 94 is pressed toward the X1 direction by the pressing spring 95 at the upper side of the switching-and-transmitting member 91.

The switching-and-transmitting member 91 also includes a restraining arm 91b which is integrally formed therewith, and which extends in the Y1 direction. The restraining arm 91b opposes the restraining projection 79 of the third transmitting member 76 at the side thereof. The side portion of the restraining arm 91b in the Y1 direction at the end thereof in the X1 direction served as a restraining portion 91c.

A reversing spring 97 is provided between the switching-and-transmitting member 91 and the bottom base 1. In FIG. 6, the reversing spring 97 applies force to the switching-and-transmitting member 91 in the X1 direction, and the switching-and-transmitting member 91 is stably positioned in a manner shown in FIG. 6. When the starting-and-pressing portion 76a of the third transmitting member 76 presses the rack 94 in the X2 direction, the rack 94 and the second driving gear 85 become engaged with each other, and the rack 94 and the switching-and-transmitting member 91 move in the X2 direction. As shown in FIG. 8, when this movement is completed, the direction of the force applied by the reversing spring 97 is reversed, and the reversing spring 97 presses the switching-and-transmitting member 91 in the X2 direction. Accordingly, the switching-and-transmitting member 91 is stably positioned in a manner shown in FIG. 8.

As shown in FIG. 6, a rotating member 101 is rotatably supported by a supporting shaft 102 at the upper side of the bottom base 1. The rotating member 101 is provided with a partial gear 101a of which the pitch circle has the supporting shaft 102 as a center. In addition, a reversing gear 103 is rotatably supported by a supporting shaft 104 at the upper side of the bottom base 1 and at the position adjacent to the rotating member 101, and is engaged with the partial gear 101a.

A switching rack 98 is provided in the Y2 direction relative to the switching-and-transmitting member 91. The switching rack 98 opposes the top surface of the bottom base 1, and is engaged with the reversing gear 103. As shown in FIG. 6, when the switching-and-transmitting member 91 moves in the X1 direction, the moving power thereof is transmitted from the switching rack 98 to the rotating member 101 via the reversing gear 103, and the rotating member 101 is rotated clockwise. When the switching-and-transmitting member 91 moves in the X2 direction, the rotating member 101 is rotated counterclockwise.

As shown in FIGS. 1, 6, and 8, an up/down switching member 106 is disposed at the edge of the bottom base 1 and the top base 2 in the X1 direction. The up/down switching member 106 is provided with oblong guide holes 106a and 106a which extend in the Y direction. The side plate 1a of the bottom base 1 is provided with guide shafts 107 and 107 on the outwardly facing surface thereof, and the guide shafts 107 and 107 are inserted through the oblong guide holes 106a and 106a. Accordingly, the up/down switching member 106 is able to reciprocate in the Y1 and Y2 directions outside the side plate 1a of the bottom base 1.

As shown in FIG. 6, the up/down switching member 106 is provided with an oblong driving hole 106b at the end thereof in the Y2 direction, which extends in the X2 direction. A driving projection 105, which is provided on the rotating member 101, is inserted through the oblong driving hole 106b so that it can move in a slidable manner. Thus, when the rotating member 101 in the state shown in FIG. 6 is rotated counterclockwise and the state shown in FIG. 8 is realized, the up/down switching member 106 is moved in the Y2 direction.

As shown in FIGS. 1, 9A and 9B, the side plate 2f of the top base 2 is provided with guiding shafts 108 and 108, which are fixed to the outwardly facing surface thereof. In addition, the up/down switching member 106 is provided with an up/down guiding holes 106c and 106c, which are inclined downward toward the Y1 direction. The guiding shafts 108 and 108 are inserted through the up/down guiding holes 106c and 106c in a slidable manner. When the rotating member 101 is rotated and the up/down switching member 106 is moved in the Y2 direction, the top base 2 is moved toward the bottom base 1 due to the up/down guiding holes 106c and 106c, and the state shown in FIG. 9A changes to the state shown in FIG. 9B.

A locking unit 110 is provided between the chassis 3 and the mechanical unit, which is constructed by joining the bottom base 1 and the top base 2. The rotating member 101 is provided with a locking protrusion 110b which is integrally formed therewith. As shown in FIG. 6, in a state in which the disc drive waits for a disc to be inserted, the locking protrusion 110b abuts against a bulge portion 3a provided on the chassis 3, so that the mechanical unit is restrained from moving in the Y2 direction.

In addition, as shown in FIGS. 1 and 6, a pair of locking projections 106d and 106d are provided on the outwardly facing surface of the up/down switching member 106. In the state shown in FIG. 6, the locking projection 106d is disposed under a protruding tab 3b, which projects inward from the side plate of the chassis 3, so that the mechanical unit is restrained from moving upward inside the chassis 3.

As shown in FIG. 8, when the disc is mounted on the turntable 7, the locking protrusion 110b and the locking projection 106d are separated from the bulge portion 3a and the protruding tab 3b, respectively, and the mechanical unit is elastically supported by the elastic supporters 4.

Another rotating member 101 and up/down switching member 106 are provided in a similar manner at the edge of the mechanical unit in the X2 direction. This rotating member 101 and the up/down switching member 106 are also driven by the switching-and-transmitting member 91. More specifically, the top base 2 is moved in the vertical direction by the up/down switching members 106 which are disposed at both sides of the mechanical unit in the X1 and X2 directions, and the mechanical unit is restrained by the locking units 110 which are also disposed at both sides of the mechanical unit in the X1 and X2 directions. In addition, locking projections, which restrain the mechanical unit from moving in the Y1 direction, are also provided at other locations.

Next, sequential operations of the disc drive will be explained below. Waiting state in which the disc drive waits for a disc to be inserted.

As shown in FIG. 2, when the disc drive waits for a disc to be inserted, the type-detecting member 51 is rotated clockwise. In addition, the positioning arm 43 is rotated clockwise, and the positioning arm 41 is rotated counterclockwise. Thus, the positioning projections 47 and 48 are positioned at the ends of the slits 2i and 2i in the Y2 direction.

As shown in FIG. 2, the detecting member 61, which is included in the load condition detecting unit 60, is rotated clockwise by the force applied from the draft spring 64, and the detecting projection 61a is positioned between the positioning projections 47 and 48. In addition, the starting member 62 is rotated counterclockwise. Thus, in the starting-and-transmitting unit 70, the connecting spring 74 pulls the first and the second transmitting members 71 and 72 toward each other, and both transmitting members 71 and 72 are rotated counterclockwise. Thus, the third transmitting member 76 is rotated clockwise, and the starting-and-pressing portion 76a provided on the third transmitting member 76 is separated from the rack 94.

As shown in FIG. 6, in the switching unit 90, the switching-and-transmitting member 91 is moved in the X1 direction and is stably positioned due to the reversing spring 97. The rack 94, which is provided at the upper side of the switching-and-transmitting member 91, is pressed in the X1 direction by the pressing spring 95, and is moved in the X1 direction by the amount allowed by the movement of the pins 93 and 93 inside the oblong holes 94a and 94a. Thus, the rack 94 is not engaged with the second driving gear 85.

Since the switching-and-transmitting member 91 is moved in the X1 direction, the reversing gear 103 is rotated counterclockwise by the switching rack 98, and the rotating member 101 is rotated clockwise. Thus, the up/down switching member 106 is moved in the Y1 direction by the driving projection 105 provided on the rotating member 101.

As shown in FIG. 9A, since the up/down switching member 106 is moved in the Y1 direction, the guiding shafts 108 and 108 are positioned at the ends inside the up/down guiding holes 106c and 106c at the right. Thus, the top base 2 is moved upward, away from the bottom base 1.

At this time, the linking arm 17 is rotated counterclockwise as shown in FIG. 9A. Thus, in FIG. 2, the direction-converting arm 16 is rotated clockwise, so that the clamp-driving member 13 is moved in the X1 direction. Accordingly, as shown in FIG. 11A, in the disc-clamping unit 10, the supporter 15 and the clamp-supporting member 11 are lifted by the first elastic arms 15c of the supporter 15 to a position high enough that the insertion of the disc is not obstructed.

In addition, as shown in FIG. 9A, the roller-supporting member 25 is rotated clockwise, and the receiving/ejecting slot 28, which is formed between the guide surface 25b of the roller-supporting member 25 and the top base 2, is widely opened. In addition, the transfer roller 31 is pressed against the opposing pad 33 due to the force applied from the draft spring 27.

As shown in FIG. 6, in the locking unit 110, the locking protrusion 110b of the rotating member 101 abuts against the bulge portion 3a of the chassis 3, and the locking projections 106d and 106d are disposed under the protruding tab 3b which is provided on the chassis 3. Thus, the mechanical unit, which is constructed by joining the bottom base 1 and the top base 2, is restrained and is locked inside the chassis 3.

Disc Positioning Operation and Load Condition Detecting Operation

When the disc is inserted through the receiving/ejecting slot 28, the insertion of the disc is detected by an optical detector disposed between the bottom base 1 and the top base 2. Then, a starting command is transmitted from a control circuit to the motor 81 in the driving unit 80 shown in FIG. 6. The rotational force of the motor 81 is transmitted from the worm gear 82 to the first driving gear 84 via the reduction gear train 83, and the first driving gear 84 and the second driving gear 85 is continuously rotated counterclockwise (CCW).

The rotational force of the first driving gear 84 is transmitted to the roller shaft 32, which is in the state shown in FIG. 9A, via a power transmission gear train (not shown in the figure), and the roller shaft 32 is rotated counterclockwise. When the disc reaches the position between the transfer roller 31 and the opposing pad 33, the disc is transferred toward the bottom edge of the disc drive (the edge in the Y1 direction) due to the rotational force of the transfer roller 31.

When the small-diameter disc DS is inserted through the receiving/ejecting slot 28 at the central region thereof, the peripheral portion of the disc does not knock against the detecting projection 54. Accordingly, the type-detecting member 51 does not move while the small-diameter disc DS is transferred in the Y1 direction. When the small-diameter disc DS is inserted at the region slightly shifted from the central region in the X2 direction, the peripheral portion of the disc presses the detecting projection 54 in the X2 direction while the disc is transferred in the Y1 direction by the transfer roller 31. Accordingly, the type-detecting member 51 is rotated counterclockwise. However, since the peripheral portion of the small-diameter disc DS comes away from the detecting projection 54 while the disc is further transferred in the Y1 direction, the type-detecting member 51 is rotated clockwise by the draft spring 53 and returns to the original position.

Accordingly, when the small-diameter disc DS is inserted into the disc drive, the positioning-and-locking member 55 is moved in the X2 direction by the type-detecting member 51, and the positioning projection 48 is restrained by the restraining portion 55a formed in the positioning-and-locking member 55. Thus, the positioning arm 43 does not rotate from the position shown in FIG. 2, and the positioning arm 41, which is engaged with the positioning arm 43 via the partial gears 43a and 41a, also does not rotate. Thus, the positioning projections 47 and 48 are restrained inside the slits 2i and 2i at the ends closer to the receiving/ejecting slot 28 (the ends in the Y2 direction)

When the small-diameter disc DS is transferred in the Y1 direction, the peripheral portion of the small-diameter disc DS knocks against the positioning projections 47 and 48 at front regions thereof, and the small-diameter disc DS is centered in the X direction by the positioning projections 47 and 48. For example, when the small-diameter disc DS first knocks against one of the positioning projections 47 and 48, the small-diameter disc DS rotates around that positioning projection while it is further transferred in the Y1 direction. Then, when the peripheral portion of the small-diameter disc DS knocks against the other one of the positioning projections 47 and 48, the centering of the small-diameter disc DS is completed. At this time, the central opening of the small-diameter disc DS is positioned approximately directly above the guide hub 7b of the turntable 7.

As shown in FIG. 3, when the centering of the small-diameter disc DS is completed, the front end of the small-diameter disc DS which is at the center in the X direction knocks against the detecting projection 61a of the detecting member 61, which is included in the load condition detecting unit 60. Thus, the detecting projection 61a is pressed in the Y1 direction. Accordingly, the detecting member 61 is rotated counterclockwise (CCW) around the positioning projection 47 which is positioned at the end 61c1 of the cam hole 61c, and the starting member 62, which is connected to the detecting member 61, is rotated clockwise (CW).

Figure 4:
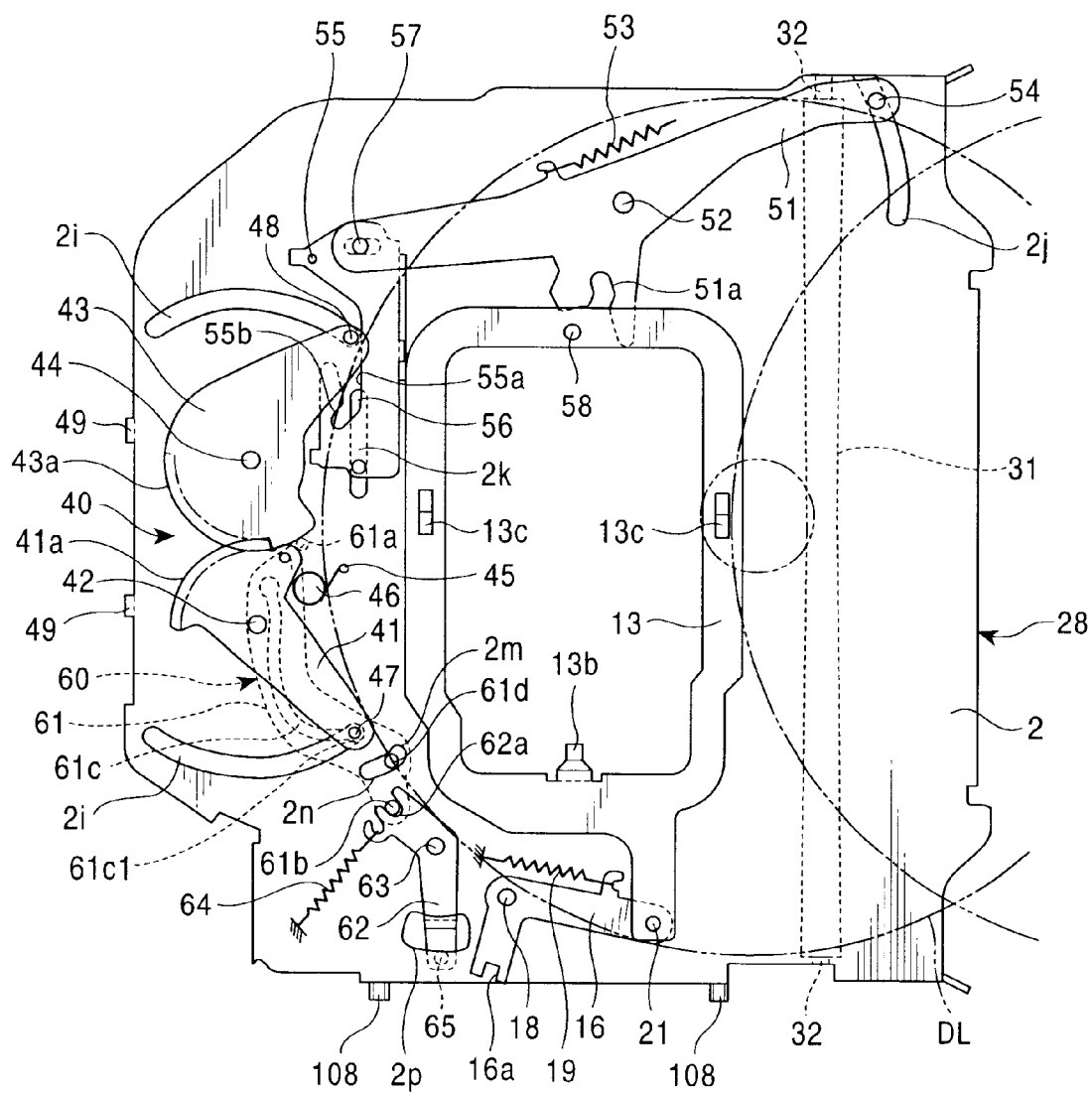
FIG. 4 is a plan view of the disc drive, showing a state in which a large-diameter disc is being transferred.
Figure 4:
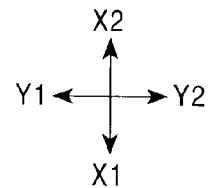

Next, the casein which the large-diameter disc DL is inserted through the receiving/ejecting slot 28, is sandwiched by the transfer roller 31 and the opposing pad 33, and is transferred by the rotational force of the transfer roller 31 in the Y1 direction, as shown in FIG. 4 is considered. In such a case, the peripheral portion of the large-diameter disc DL presses the detecting projection 54 in the X2 direction at the front regions thereof in the transferring direction, and the type-detecting member 51 is rotated counterclockwise around the supporting shaft 52. Thus, the positioning-and-locking member 55 which is connected to the type-detecting member 51 is moved in the X1 direction. Accordingly, by the time the large-diameter disc DL reaches the positioning projections 47 and 48, the positioning projection 48 is released from the restraining portion 55a of the positioning-and-locking member 55, so that the positioning arm 43 can rotate freely.

Accordingly, as shown in FIG. 5, while the large-diameter disc DL is transferred by the transfer roller 31, the peripheral portion of the large-diameter disc DL at the front end thereof in the transferring direction presses the positioning projections 47 and 48 in the Y1 direction. Thus, the positioning arm 41 rotates clockwise, and the positioning arm 43 rotates counterclockwise in association with the rotation of the positioning arm 41.

Concurrently, the positioning projection 47 slides inside the cam hole 61c of the detecting member 61. Thus, the detecting member 61 is rotated counterclockwise (CCW) around the connecting pin 61b, and the moving pin 61d moves inside the moving hole 2n, which is formed in the top base 2.

When the large-diameter disc DL reaches the positioning members 49 and 49, which are shown in FIGS. 1 and 4, the central opening of the large-diameter disc DL is positioned approximately directly above the guide hub 7b of the turntable 7. As shown in FIG. 5, at this time, the detecting member 61 is further rotated counterclockwise around the moving pin 61d, which has reached the end of the moving hole 2n. In addition, the starting member 62 is rotated clockwise (CW) around the supporting shaft 63 via the connecting pin 61b.

When the positioning projections 47 and 48 are pressed by the large-diameter disc DL and the positioning arms 41 and 43 are rotated by a certain angle, the direction of the force applied by the reversing spring 46 is reversed. Accordingly, the positioning arm 41 receives the clockwise force, and the positioning arm 41 is stably positioned in a manner such that the positioning arm 41 is rotated clockwise. In addition, the positioning arm 43 is stably positioned in a manner such that the positioning arm 43 is rotated counterclockwise. In addition, when the large-diameter disc DL knocks against the positioning members 49 and 49 and is positioned, the peripheral portion thereof in the Y2 direction is separated from the detecting projection 54 as shown in FIG. 5. Thus, the type-detecting member 51 is rotated clockwise by the force applied from draft spring 53, and the positioning-and-locking member 55 is moved in the X2 direction. Accordingly, an end portion 55c of the positioning-and-locking member 55 in the X1 direction opposes the positioning arm 43 in the X2 direction.

Starting and Transmitting Operation and Switching Operation

When the central opening of the small-diameter disc DS or of the large-diameter disc DL is positioned approximately directly above the turntable 7, the starting member 62 is rotated clockwise by the detecting member 61.

The rotation of the starting member 62 is transmitted to the starting-and-transmitting unit 70, which is disposed under the bottom base 1, via the starting pin 65. More specifically, the starting pin 65 moves in the Y1 direction due to the clockwise rotation of the starting member 62, so that the unit including the first and the second transmitting members 71 and 72 shown in FIG. 6 is rotated around the supporting shaft 73. Since the second transmitting member 72 is connected to the third transmitting member 76 by the connecting pin 78, the third transmitting member 76 is rotated counterclockwise. Accordingly, the rack 94 is pressed in the X2 direction by the starting-and-pressing portion 76a which is formed in the third transmitting member 76.

The rack 94, which is pressed by the starting-and-pressing portion 76a, moves above the switching-and-transmitting member 91 in the X2 direction within the range corresponding to the length of the oblong holes 94a and 94a, and becomes engaged with the second driving gear 85. Since the second driving gear 85 is rotated counterclockwise at this time, the rotational force thereof moves the rack 94 and the switching-and-transmitting member 91 to the position shown in FIG. 8.

While the switching-and-transmitting member 91 is moved in the X2 direction, the direction of the force applied by the reversing spring 97 is reversed, and the switching-and-transmitting member 91 receives the force in the X2 direction. Accordingly, the switching-and-transmitting member 91 is stably positioned in the manner shown in FIG. 8. Then, a detecting switch (not shown), etc., detects that the movement of the switching-and-transmitting member 91 is completed, and the motor 81 is then stopped.

Immediately after the switching-and-transmitting member 91, which is at the position shown in FIG. 6, starts to move in the X2 direction, the restraining portion 91c presses the restraining projection 79. Thus, the third transmitting member 76 is restrained in a manner such that the third transmitting member 76 is rotated counterclockwise. Accordingly, the unit including the first and the second transmitting members 71 and 72 is restrained in a manner such that the unit is rotated clockwise. In addition, the starting member 62 is also restrained at the upper side of the top base 2 in a manner such that the starting member 62 is rotated clockwise (CW), and the detecting member 61 is also restrained at the position shown in FIG. 3.

Accordingly, as shown in FIG. 3, immediately after the detecting member 61 is rotated counterclockwise by the transferring force of the small-diameter disc DS in the Y1 direction, the detecting member 61 is restrained at the position. Thus, the detecting projection 61a of the detecting member 61, which receives the force from the draft spring 64, does not push back the small-diameter disc DS at the position shown in FIG. 3 in the Y2 direction to the position shown in FIG. 2 before the small-diameter disc DS is reliably clamped on the turntable 7.

As shown in FIG. 5, when the large-diameter disc DL is inserted, the positioning arm 41 is stably positioned in a manner such that the positioning arm 41 is rotated clockwise due to the force applied by the reversing spring 46. In addition, the detecting member 61 is also stably positioned at the position shown in FIG. 5 due to the engagement between the positioning projection 47 and the cam hole 61c. At this time, the detecting projection 61a is separated form the large-diameter disc DL. Thus, in the case in which the large-diameter disc DL is inserted, the detecting member 61 does not press the large-diameter disc DL in the Y2 direction before the large-diameter disc DL is clamped.

While the switching-and-transmitting member 91 moves from the position shown in FIG. 6 to the position shown in FIG. 8, the reversing gear 103 is rotated clockwise by the switching rack 98. Thus, the rotating member 101, which has the partial gear 101a which is engaged with the reversing gear 103, is rotated counterclockwise. Accordingly, the driving projection 105 of the rotating member 101 applies moving force to the oblong driving hole 106b in the Y2 direction, so that the up/down switching member 106 is moved to the position shown in FIG. 8.

As shown in FIG. 9B, when the up/down switching member 106 is moved in the Y2 direction, the guiding shafts 108 and 108 provided on the top base 2 are moved downward by the up/down guiding holes 106c and 106c formed in the up/down switching member 106. Accordingly, the top base 2 is moved downward toward the bottom base 1.

In addition, as shown in FIG. 8, the locking protrusion 110b comes away form the bulge portion 3a of the chassis 3 due to the counterclockwise rotation of the rotating member 101. In addition, the locking projections 106d and 106d formed in the up/down switching member 106 come out from under the protruding tab 3b of the chassis 3 in the Y2 direction. Accordingly, in the locking unit 110, the mechanical unit including the bottom base 1 and the top base 2 is elastically supported by the elastic supporters 4 on the chassis 3.

Disc Clamping Operation

When the top base 2 and the bottom base 1 are in a state in which they are further separated from each other, the linking arm 17 is rotated counterclockwise as shown in FIG. 9A. In addition, as shown in FIG. 2, the direction-converting arm 16 is rotated clockwise, and the clamp-driving member 13 is moved in the X1 direction.

As shown in FIG. 11A, in the waiting state, the first pressing portion 13b of the clamp-driving member 13 is separated from the protrusion 11d of the clamp-supporting member 11. In addition, the second pressing portions 13c and 13c are disposed inside the clearance holes 1e and 1e of the clamp-supporting member 11. Accordingly, the supporter 15 is lifted due to the opposing force applied to the supporting surfaces 2d and 2e by the first elastic arms 15c. In addition, the clamp-supporting member 11, which is fixed to the supporter 15, is pressed against the bottom surface of the clamp-driving member 13 inside the opening 2a of the top base 2. In addition, the clamp 14 receives the downward force from the second elastic arm 15d of the supporter 15, and is pressed against the top surface of the clamp-supporting member 11 at the peripheral portion of the central opening 11a.

In a state shown in FIG. 11A, the top base 2 which supports the clamp 14 is further separated from the bottom base 1. Accordingly, space for receiving the disc is provided between the disc-pressing portion 14a of the clamp 14 and the turntable 7 provided on the bottom base 1.

When the up/down switching member 106 is moved in the Y2 direction and the top base 2 is moved downward toward the bottom base 1 as shown in FIG. 9B, the clamp 14 is also moved downward along with the top base 2. In addition, the disc, which is sandwiched by the transfer roller 31 and the opposing pad 33, is also moved downward along with the top base 2.

When the downward movement of the top base 2 is completed as shown in FIG. 9B, the guide hub 7b of the turntable 7 is fitted into the central opening of the disc. In addition, the top end of the guide hub 7b is inserted into the concave portion 14c which is open at the bottom surface of the clamp 14. Accordingly, the disc is clamped between the flange 7a of the turntable 7 and the bottom surface of the disc-pressing portion 14a of the clamp 14. As described above, by the time when the downward movement of the top base 2 is completed, the clamping of the disc is completed, or at least the guide hub 7b of the turntable 7 is fitted into the central opening of the disc so that the disc cannot move.

As shown in FIG. 9B, the linking arm 17 rotates clockwise in association with the downward movement of the top base 2. At the same time, as shown in FIG. 10, the direction-converting arm 16 is rotated counterclockwise, and the clamp-driving member 13 is moved above the top base 2 in the X2 direction.

Accordingly, as shown in FIG. 11B, the first pressing portion 13b of the clamp-driving member 13 is moved to the position directly on top of the protrusion 11d of the clamp-supporting member 11. In addition, the second pressing portions 13c and 13c come out of the clearance holes 11e and 11e of the clamp-supporting member 11, and mount on the clamp-supporting member 11. Thus, the clamp-supporting member 11 is pressed toward the turntable 7, and the peripheral portion around the central opening 11a of the clamp-supporting member 11 is separated from the supporting flange 14b of the clamp 14. Accordingly, the clamp 14, which receives the force from the second elastic arm 15d of the supporter 15, is elastically pressed against the disc.

In the above-described clamping operation, the clamp-supporting member 11 is separated from the clamp 14 and the clamp 14 is elastically pressed against the disc as shown in FIG. 11B immediately after the top base 2 is moved downward and the disc is clamped by the turntable 7 and the clamp 14. However, the clamp-supporting member 11 may also be moved downward by the clamp-driving member 13 at the same time the top base 2 is moved downward from the position shown in FIG. 11A to the position shown in FIG. 11B, and be separated from the clamp 14 before the top base 2 reaches the position shown in FIG. 11B.

In the present embodiment, the clamp 14 moves downward along with the top base 2, and the clamp-supporting member 11 comes away from the clamp 14 due to the moving force of the clamp-driving member 13 in the horizontal plane. Thus, even when the downward moving force of the top base 2 is small, the elastic force for pressing the disc may be applied to the clamp 14.

When the small-diameter disc DS is inserted, the positioning projections 47 and 48 serves to center the disc DS, and then the above-described clamping operation is performed. Thus, if the disc DS is rotated by the turntable 7, the peripheral portion of the disc DS contacts the positioning projections 47 and 48. To avoid this, in the present embodiment, the restraining pin 58, which is provided on the clamp-driving member 13, is inserted into the pressing groove 51a of the type-detecting member 51 as shown in FIG. 10 when the clamp-driving member 13 is moved in the X2 direction. Thus, the type-detecting member 51 is slightly rotated clockwise.

Accordingly, the positioning-and-locking member 55 is slightly moved in the X2 direction by the type-detecting member 51, and the sheltering-and-restraining portion 55b, which is formed in the positioning-and-locking member 55, restrains the positioning projection 48. Thus, the positioning arm 43 is slightly rotated counterclockwise compared to the position at which the positioning arm 43 is positioned in a state shown in FIG. 3, in which the centering of the small-diameter disc DS is just completed. In addition, the positioning projection 48 is separated form the peripheral portion of the small-diameter disc DS. The positioning arm 41 is rotated clockwise along with the counterclockwise rotation of the positioning arm 43, so that the positioning projection 47 is also separated from the small-diameter disc DS. Thus, the small-diameter disc DS may be rotated without contacting the positioning projections 47 and 48.

In the case in which the large-diameter disc DL is inserted, the disc is positioned by knocking against the positioning members 49 and 49 at a position such that the center of the large-diameter disc DL is slightly shifted in the Y1 direction relative to the center of the turntable 7. When the guide hub 7b of the turntable 7 is inserted into the central opening of the large-diameter disc DL, the large-diameter disc DL is moved slightly backward in the Y2 direction and is centered by the tapered surface at the upper periphery of the guide hub 7b. Accordingly, when the clamping of the large-diameter disc DL is completed, the large-diameter disc DL is separated from the positioning members 49 and 49.

The positioning members 49 and 49 are integrally formed with the top base 2, and is not included in a moving mechanism as the positioning projections 47 and 48, which are used for positioning the small-diameter disc DS. Thus, by controlling the positional relationship between the center of the turntable 7 and the positioning members 49 and 49 in accordance with the shape of the tapered surface of the guiding hub 7b with high accuracy, the peripheral portion of the large-diameter disc DL may be separated from the positioning members 49 and 49 by the time the clamping thereof is completed.

As shown in FIG. 9B, after the small-diameter disc DS or the large-diameter disc DL is clamped by the turntable 7 and the clamp 14, the roller-supporting member 25 rotates counterclockwise in accordance with the downward movement of the top base 2. Thus, the transfer roller 31 moves away from the bottom surface of the disc.

Accordingly, the spindle motor 6 becomes able to rotate the turntable 7, and recording or reading process can be performed by an optical pickup while the disc is rotated.

Disc Ejecting Operation

When a disc-ejecting command is issued, the spindle motor 6 stops to rotate the disc. Then, the motor 81 shown in FIG. 6 starts immediately, and the first driving gear 84 and the second driving gear 85 is rotated clockwise via the reduction gear train 83. In addition, as shown in FIG. 9B, the transfer roller 31, which is separated from the disc, is rotated clockwise.

When the second driving gear 85 is rotated clockwise, the rack 94 shown in FIG. 8 is moved backward in the X1 direction, and the switching-and-transmitting member 91 is also moved in the X1 direction along with the rack 94 and returns to the position shown in FIG. 6. Then, the motor stops. While the switching-and-transmitting member 91 is being moved backward toward the position shown in FIG. 6, the up/down switching member 106 is moved backward in the Y1 direction. Accordingly, the top base 2 is moved upward, and the clamping of the disc is canceled. In addition, the disc is sandwiched by the transfer roller 31 and the opposing pad 33, is transferred toward the receiving/ejecting slot 28 by the transfer roller 31, and is ejected.

In the case in which the small-diameter disc DS is ejected, the up/down switching member 106 moves in the Y1 direction, and the waiting state shown in FIG. 2 is reestablished.

In the case in which the large-diameter disc DL is ejected, the peripheral portion of the disc DL presses the detecting projection 54 when the disc DL is transferred in the Y2 direction by the transfer roller 31 from the position shown in FIG. 5. Thus, the type-detecting member 51 is rotated counterclockwise, and the positioning-and-locking member 55 is moved in the X1 direction from the position shown in FIG. 5. Accordingly, the positioning arm 43 is pressed by the end 55c of the positioning-and-locking member 55 in the X1 direction, and the positioning arm 43 is forced to rotate clockwise. In association with the rotation of the positioning arm 43, the positioning arm 41 is rotated counterclockwise, and the direction of the force applied by the reversing spring 46 is reversed. The positioning arm 41 is then rotated counterclockwise by the force applied by the reversing spring 46, and the positioning arm 43 is rotated clockwise in association with the rotation of the positioning arm 41. Accordingly, the positioning projections 47 and 48 return to the positions in the waiting state shown in FIG. 4.

In the case in which the small-diameter disc DS is ejected, the disc DS is separated from the detecting projection 61a of the detecting member 61 by the time the end portion of the disc DS in the Y2 direction reaches the receiving/ejecting slot 28. However, in the case in which the large-diameter disc DL is ejected, the detecting member 61 cannot return to the position in the waiting state shown in FIG. 4 by the time the end portion of the disc DL in the Y2 direction reaches the receiving/ejecting slot 28.

Accordingly, when the end portion of the large-diameter disc DL in the Y2 direction collides with an obstacle such as a person's hand, etc., and the movement of the disc DL is forced to stop, the detecting member 61 is restrained in a manner such that the detecting member 61 is rotated counterclockwise as shown in FIG. 5. Thus, the starting member 62 is restrained in a manner such that the starting member 62 is rotated clockwise (CW), and the state shown in FIG. 8 is maintained. That is, the unit including the first and the second transmitting members 71 and 72 is stopped in a manner such that the unit is rotated clockwise, and the third transmitting member 76 is stopped in a manner such that the third transmitting member 76 is rotated counterclockwise. On the other hand, the motor 81 continues to rotate while slipping occurs between the transfer roller 31 and the disc DL or between the transfer roller 31 and the roller shaft 32. Thus, the rack 94 and the switching-and-transmitting member 91 are moved in the X1 direction by the second driving gear 85. Then, as shown in FIG. 7, the rack 94 knocks against the starting-and-pressing portion 76a of the third transmitting member 76, which is rotated counterclockwise, and presses the starting-and-pressing portion 76a so as to forcedly rotate the third transmitting member 76 clockwise.

Accordingly, the first transmitting member 71 is restrained in a manner such that the first transmitting member 71 is rotated clockwise, and the second transmitting member 72 is rotated counterclockwise by the third transmitting member 76. The connecting spring 74 is elongated, and the first and the second transmitting members 71 and 72 are rotated in the opposite directions. Since the first and the second transmitting members 71 and 72 are rotated in the directions away from each other as described above, the starting-and-transmitting unit 70 is prevented from being locked.

In the present embodiment, the mechanism is not locked even when the large-diameter disc DL collides with an obstacle when it is ejected through the receiving/ejecting slot 28. Thus, a disc insertion slot in the housing of the disc drive may be disposed directly before the receiving/ejecting slot 28 (in the Y2 direction). Accordingly, the depth in the Y direction of the disc drive may be reduced.

What is claimed is:

1. A disc drive comprising:

a first base;

a second base opposing said first base;

a gap between said first base and said second base;

a turntable connected with said first base;

a motor for rotating said turntable;

a clamp connected with said second base and operable to press a disc against said turntable;

up/down switching member operable to move at least one of said first base and said second base such that the proximity of said first base from said second base may be altered;

a linking member rotatably supported by said second base and operable to rotate when the proximity of said first base to said second base is altered; and a driving member connected with said second base, said driving member driven by the rotational force of said linking member and operable to clamp the disc.

2. The disc drive of claim 1 wherein said first base is a bottom base and said second base is a top base.

3. The disc drive of claim 1 wherein said first base is a top base and said second base is a bottom base.

4. The disc drive of claim 1 further comprising a direction-converting member connected with said second base and operable to convert the rotational force of said linking member to the rotational force along the surfaces of said first and second bases and to move said driving member along the surfaces of the bases.

5. The disc drive of claim 1 further comprising a positioning member connected with said second base operable to position the disc on the turntable and to position itself away from the disc when the disc is clamped on the turntable.

6. A disc drive comprising:

a bottom base;

a top base opposing said bottom base;

a gap between said bottom base and said top base;

a turntable connected with said bottom base;

a motor operable to rotate said turntable;

a clamp connected with said top base and operable to press a disc against said turntable;

up/down switching member operable to move said top base between a position in proximity to said bottom base and a position further separated from said bottom base;

a linking member rotatably supported by said top base; and a driving member connected with said top base and operable to receive a rotational force from said linking member and clamp the disc, wherein said linking member is rotated by said bottom base when the proximity of said bottom base and said top base is altered.

7. The disc drive of claim 6 further comprising a direction-converting member connected with said top base and operable to convert the rotational force of said linking member to the rotational force along the surfaces of said top and bottom bases and to move said driving member along the surfaces of said top and bottom bases.

8. The disc drive of claim 6 wherein said linking member is attached to said top base in a rotatable manner and includes a first engagement pin engaged with said direction-converting member and a second engagement pin engaged with said bottom base, and wherein said linking member rotates said direction-converting member when said bottom base and said top base move closer to each other, and thereby moves said driving member.

9. A disc drive according to claim 6, wherein said clamp is movable in the vertical direction relative to said top base.

10. The disc drive of claim 6 further comprising a positioning member connected with said top base and operable to position the disc on the turntable and position itself away from the disc when the disc is clamped on the turntable.

11. A disc drive comprising:
- a bottom base;
- a top base opposing said bottom;
- a gap between said bottom base and said top base;
- a turntable connected with said bottom base;
- a motor operable to rotate said turntable;
- a clamp connected with said top base and operable to press a disc against said turntable;
- up/down switching member operable to move said top base between a position in proximity to said bottom base and a position further separated from said bottom base;
- a linking member rotatably supported by said top base;
- a positioning member connected with said top base and operable to position the disc on the turntable; and
- a driving member connected with said top base and operable to receive a rotational force from said linking member and move said positioning member away from the disc, wherein said linking member is rotated by said bottom base when the proximity of said bottom base and said top base is altered.

12. The disc drive of claim 11 further comprising a direction-converting member connected with said top base and operable to convert the rotational force of said linking member to the rotational force along the surfaces of said top and bottom bases and to move said driving member along the surfaces of said top and bottom bases.

13. The disc drive of claim 11, wherein said linking member is attached to said top base in a rotatable manner and includes a first engagement pin engaged with said direction-converting member and a second engagement pin engaged with said bottom base, and wherein said linking member rotates said direction-converting member when said bottom base and said top base move closer to each other, and thereby moves said driving member.

14. The disc drive of claim 11 wherein said clamp is moveable in the vertical direction relative to said top base.

* * * * *